US012571482B2

(12) United States Patent

Wahlquist

(10) Patent No.: US 12,571,482 B2

(45) Date of Patent: Mar. 10, 2026

(54) POLYCRYSTALLINE DIAMOND ASSEMBLIES WITH CAST MOUNTING ELEMENTS

(71) Applicant: Schlumberger Technology Corporation, Sugar Land, TX (US)

(72) Inventor: David Wahlquist, Spanish Fork, UT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 223 days.

(21) Appl. No.: 18/314,177

(22) Filed: May 9, 2023

(65) Prior Publication Data

US 2023/0358102 A1 Nov. 9, 2023

Related U.S. Application Data

(60) Provisional application No. 63/364,353, filed on May 9, 2022.

(51) Int. Cl.
 *F16K 25/00* (2006.01)
 *F16K 1/48* (2006.01)
(52) U.S. Cl.
 CPC .............. *F16K 25/005* (2013.01); *F16K 1/48* (2013.01)
(58) Field of Classification Search
 CPC .... E21B 10/5735; F16K 25/04; F16K 25/005; F16K 1/48; E21C 35/183; E21C 35/1831; F16B 2013/007; F16B 19/1072
 USPC ............................................ 299/113; 411/55
 See application file for complete search history.

(56) References Cited

U.S. PATENT DOCUMENTS

| | | | | | |
|---|---|---|---|---|---|
| 1,499,433 | A | * | 7/1924 | Williston | F16K 1/385 251/274 |
| 2,429,783 | A | * | 10/1947 | Weiss | F16K 1/48 137/329.01 |
| 2,647,000 | A | * | 7/1953 | Colley | F16B 12/40 285/133.11 |
| 3,136,203 | A | * | 6/1964 | Davis | F16B 19/1072 29/524.1 |
| 4,705,062 | A | * | 11/1987 | Baker | F16K 1/38 251/368 |
| 4,732,364 | A | * | 3/1988 | Seger | E21B 34/02 251/360 |
| 5,201,335 | A | * | 4/1993 | Osgood | F16L 55/11 403/30 |
| 5,352,077 | A | * | 10/1994 | Lind | F16B 13/066 411/72 |
| 5,586,745 | A | * | 12/1996 | Knapp | F16K 1/38 251/903 |
| 6,632,056 | B1 | * | 10/2003 | Lind | E04F 13/0816 403/375 |
| 6,893,196 | B2 | * | 5/2005 | Wille | F16B 19/1072 411/969 |
| 6,941,721 | B2 | * | 9/2005 | Lind | E06B 3/5436 52/786.13 |

(Continued)

*Primary Examiner* — Flemming Saether

(74) *Attorney, Agent, or Firm* — Jeffrey D. Frantz

(57) ABSTRACT

A retention mechanism for a PCD insert includes an expansion bolt inserted through a mounting element into a bore of the PCD insert. The bore of the PCD insert has an opening diameter that is greater than a terminal diameter at a terminal end of the bore. The expansion anchor is expanded in the bore, and an interference of the expanded expansion bolt with the body of the PCD insert secures the PCD insert to the mounting element.

20 Claims, 13 Drawing Sheets

(56)                    References Cited

U.S. PATENT DOCUMENTS

| | | | |
|---|---|---|---|
| 7,648,210 B2 * | 1/2010 | Hall | E21C 35/1933 |
| | | | 299/113 |
| 7,992,944 B2 * | 8/2011 | Hall | E21C 35/197 |
| | | | 299/85.2 |
| 8,007,051 B2 * | 8/2011 | Hall | E21C 35/19 |
| | | | 299/113 |
| 8,061,783 B2 * | 11/2011 | Keller | E21C 35/197 |
| | | | 299/102 |
| 8,414,085 B2 * | 4/2013 | Hall | E21C 35/19 |
| | | | 299/113 |
| 10,830,359 B2 * | 11/2020 | Miller | F16K 37/005 |
| 10,920,908 B2 * | 2/2021 | Burris | F16K 1/482 |
| 2008/0187452 A1 * | 8/2008 | Hall | B22F 7/06 |
| | | | 419/5 |
| 2016/0243626 A1 * | 8/2016 | Hansson | B23B 51/0493 |
| 2022/0025733 A1 * | 1/2022 | Babler | F16K 1/38 |

* cited by examiner 562-1    552-1    558-1

575-1    561-1    563-1

562-2    552-2    558-2

575-2    561-2    563-2

562-3    552-3    558-3

575-3    561-3    563-3

562-4    552-4    558-4

575-4    561-4    563-4

POLYCRYSTALLINE DIAMOND ASSEMBLIES WITH CAST MOUNTING ELEMENTS

CROSS-REFERENCE TO RELATED APPLICATIONS

This application claims the benefit of, and priority to, U.S. Patent Application No. 63/364,353 entitled "Polycrystalline Diamond Assemblies with Cast Mounting Elements" filed May 9, 2022, which is incorporated herein by this reference in its entirety.

BACKGROUND

In order to meet consumer and industrial demand for natural resources, companies search for and extract oil, natural gas, and other subterranean resources from the earth. Once a desired subterranean resource is discovered, drilling and production systems are employed to access and extract the resource. These systems may be located onshore or offshore depending on the location of a desired resource. Production systems may include a variety of flow control devices to control a flow rate, a pressure, other fluid properties, or a combination thereof, of fluid flowing through the production system. For example, choke valves may be used to control the flow of production fluid (e.g., oil, natural gas, etc.) from a well.

Certain choke valves (e.g., needle valves) include a seat and a needle movable relative to the seat. While the needle is engaged with the seat, the flow of fluid through the choke valve is substantially blocked. As the needle moves away from the seat, a cross-sectional area of an orifice formed by the seat and the needle progressively increases, thereby increasing the flow rate of the fluid through the choke valve. An actuator coupled to the needle may drive the needle to move relative to the seat. In certain applications, the fluid may contain a significant amount of abrasive material (e.g., sand, rock particles, etc.). Over time, flow of the abrasive material through the choke valve may cause the needle to wear, thereby changing the shape of the needle. As a result, the performance of the choke valve may be altered, and/or the operational effectiveness of the choke valve may be reduced.

SUMMARY

In some embodiments, a polycrystalline diamond (PCD) insert includes a body with a retention end and a working end. The body defines a bore extending from the retention end into the body toward the working end. An opening of the bore has an opening diameter that is less than a terminal diameter of the terminal end of the bore.

In some embodiments, a kit for a PCD assembly includes a PCD insert having a body. The body has a retention end and a working end. The body defines a bore extending from the retention end into the body toward the working end. The kit includes a mounting element. The kit includes an expansion anchor having a tightening head and an expansion head. The expansion head is configured to be inserted through the mounting element and into the bore. The expansion head is expandable to secure the PCD insert to the mounting element.

In some embodiments, inserting an expansion anchor through the mounting element and into a bore in the PCD insert. The expansion anchor is expanded until at least a portion of the expansion anchor engages an inner wall of the bore.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1-2 is a cross-sectional view of the choke valve assembly of FIG. 1-1;

FIG. 2-1 and FIG. 2-2 are cross-sectional views of a PCD assembly, according to at least one embodiment of the present disclosure;

FIG. 5-1 through FIG. 5-6 are cross-sectional views of PCD inserts having bores of various geometries, according to example embodiments of the present disclosure;

FIG. 6 is a flowchart of a method for securing a PCD insert to a mounting element, according to at least one embodiment of the present disclosure.

FIG. 7-1 and FIG. 7-2 are cross-sectional views of a PCD assembly, according to example embodiments of the present disclosure;

FIG. 8-1 and FIG. 8-2 are cross-sectional views of a PCD assembly, according to example embodiments of the present disclosure.

DETAILED DESCRIPTION

This disclosure generally relates to devices, systems, and methods for securing a tip portion of a needle in a choke valve to a base portion of the needle using an expansion anchor. The tip portion may be a PCD insert or PCD element and the base portion may be formed from steel or a steel alloy. The body of the tip portion includes a bore having an opening with an opening diameter that is greater than a terminal diameter of a terminal end of the bore. An expansion anchor may be inserted through the base portion, with the expansion head being inserted into the bore of the tip portion. The expansion head may be expanded such that an expanded diameter of the expansion head is greater than the opening diameter. The interference of the expanded expansion head with the body of the tip portion may secure the tip portion to the base portion.

Figure 1:
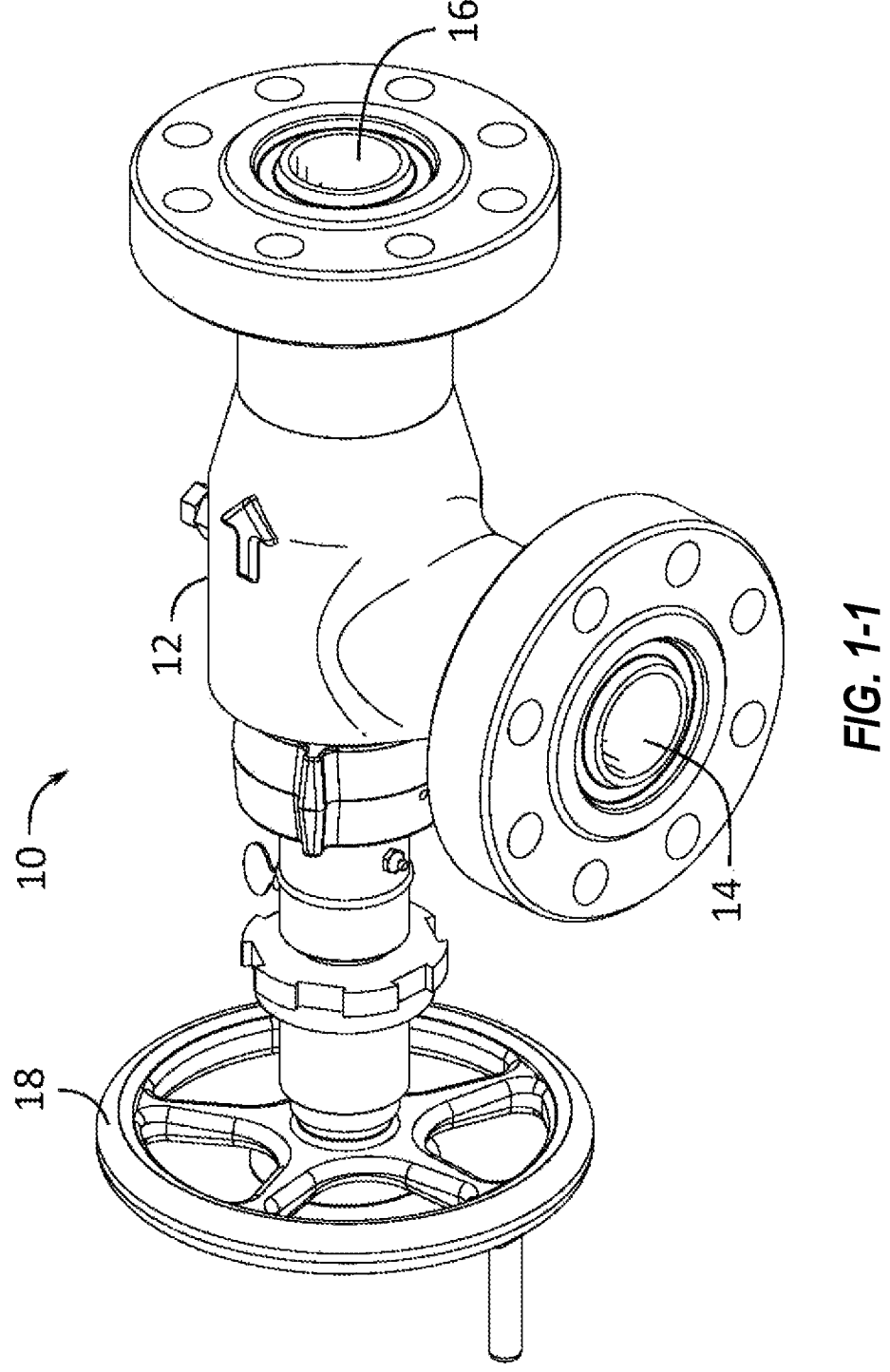
FIG. 1-1 is a perspective view of a choke valve assembly, according to at least one embodiment of the present disclosure.

FIG. 1-1 is a perspective view of an embodiment of a choke valve assembly 10. As illustrated, the choke valve assembly 10 includes a body 12 having an inlet 14 and an outlet 16. While the choke valve assembly 10 is in an open state, fluid flow through the body 12 from the inlet 14 to the outlet 16 is enabled. In addition, while the choke valve assembly 10 is in a closed state, fluid flow through the body 12 is blocked. In the illustrated embodiment, the choke valve assembly 10 includes a handle 18 configured to transition the choke valve assembly 10 between the open and closed states via manual actuation of the handle 18. In other embodiments, the choke valve assembly may include an actuator (e.g., alone or in addition to the handle), such as a hydraulic actuator, a pneumatic actuator, an electromechanical actuator, another suitable actuator, or a combination thereof, configured to drive the choke valve assembly between the open and closed states. The choke valve assembly 10 may be used within a production system to control a flow rate of fluid from a well, or within any other suitable system to control fluid flow. For example, the choke valve assembly 10 may be used to vary the flow rate of fluid pumped into a well, e.g., while drilling.

Figures 1, 2:
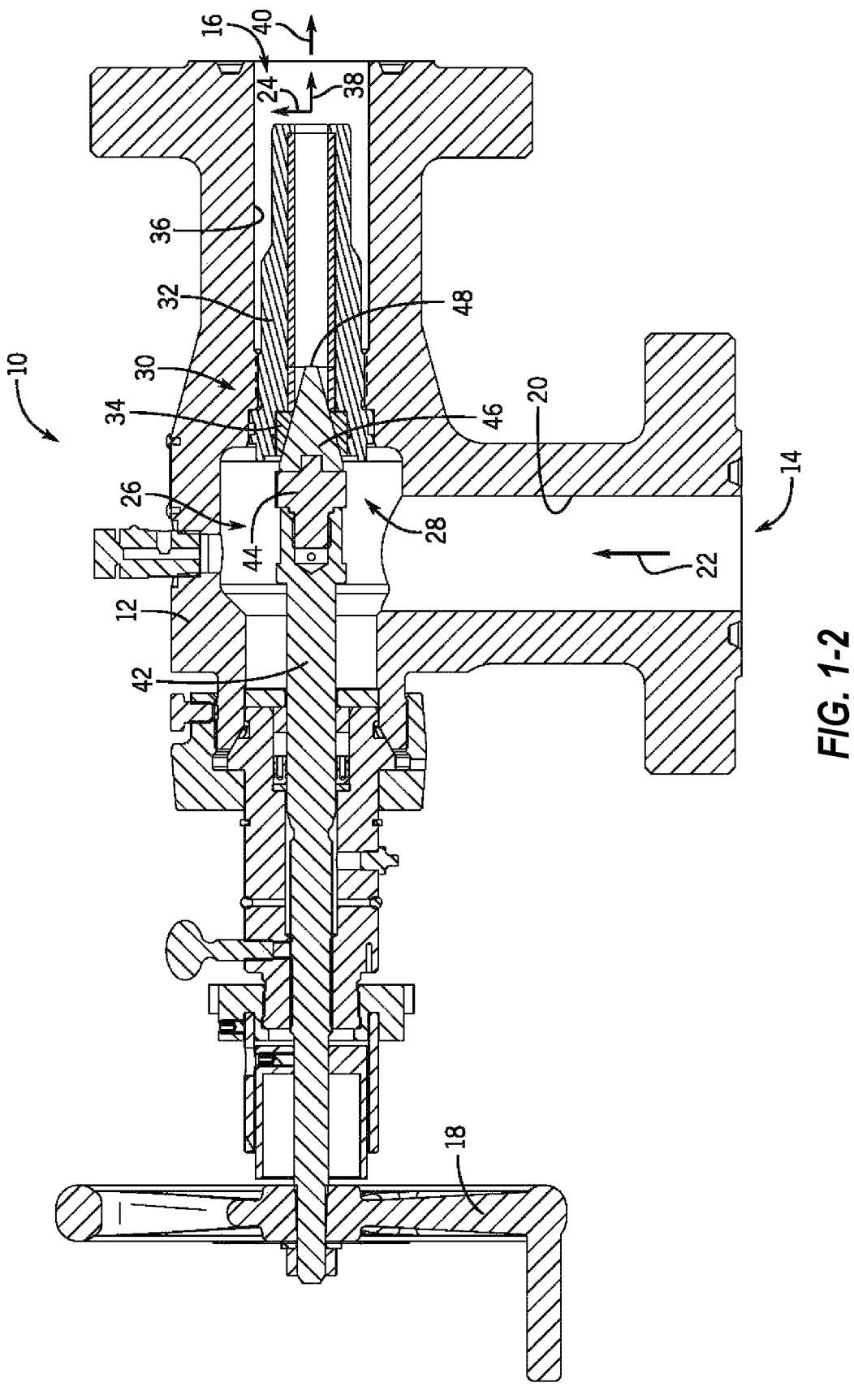
Figures 1, 2:
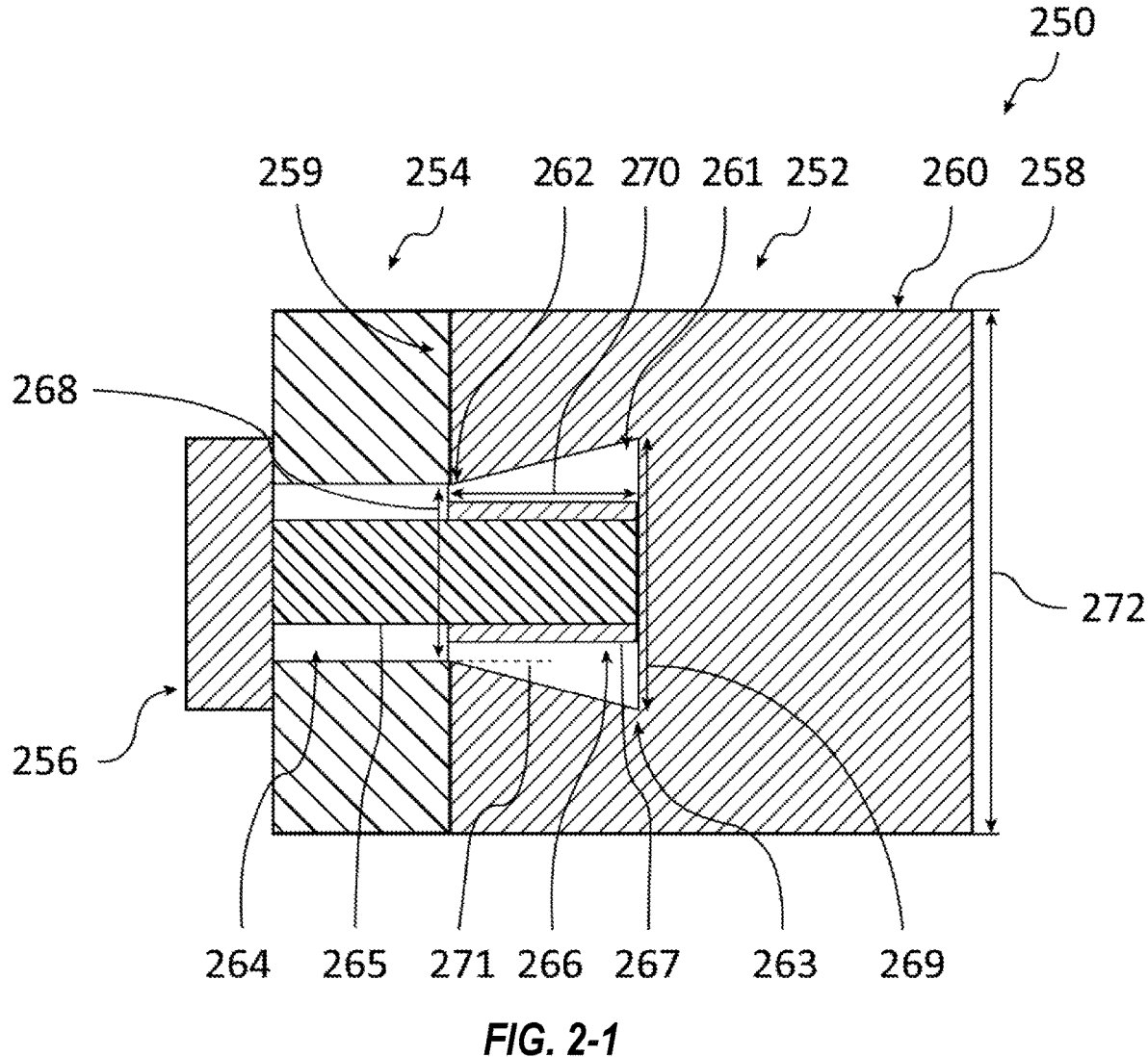
Figure 2:
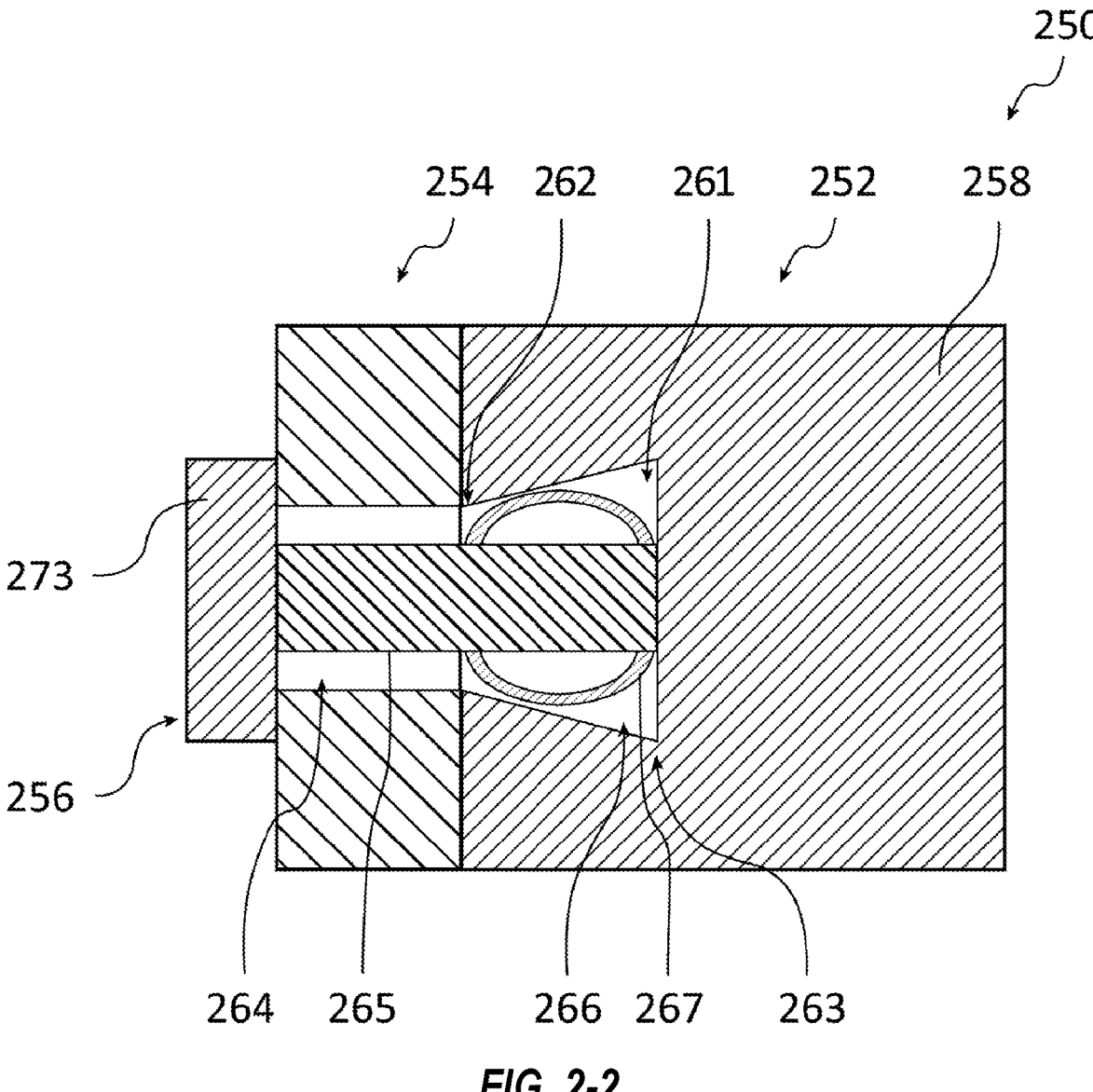

As may be seen in FIG. 1-2, the choke valve assembly 10 includes a needle configured to move along a longitudinal axis of the choke valve assembly. With the choke valve assembly in the closed state, the needle is engaged with a seat of the choke valve assembly, thereby blocking flow of the fluid through the body 12. Movement of the needle away from the seat along the longitudinal axis forms an orifice between the needle and the seat, thereby transitioning the choke valve assembly to the open state and facilitating flow of the fluid through the body 12. In certain embodiments, the needle includes a base portion formed from a first non-superhard material and a tip portion formed from a superhard material.

FIG. 1-2 is a cross-sectional view of the choke valve assembly 10 of FIG. 1-1. As previously discussed, the body 12 of the choke valve assembly includes an inlet 14 and an outlet 16. Fluid (e.g., from a well, etc.) may enter the inlet 14 and flow through an inlet passage 20 of the body 12 along an inlet flow direction 22 (e.g., along a radial axis 24 of the choke valve assembly 10). The fluid entering the inlet 14 may be at a relatively high pressure (e.g., greater than 500 psi (3.45 MPa), greater than 1000 psi (6.89 MPa), greater than 5000 psi (34.47 MPa), greater than 10,000 psi (68.95 MPa), greater than 15,000 psi (103.42 MPa), greater than 20,000 psi (137.90 MPa), greater than 25,000 psi (172.37 MPa), greater than 30,000 psi (206.84 MPa), or any range between the foregoing), and a significant amount of abrasive material (e.g., sand, particles, etc.) may be entrained within the fluid. For example, the fluid may enter the inlet 14 after being used for fracking a reservoir and may, therefore, include a significant amount of sand. The fluid flows through the inlet 14 along the inlet flow direction 22 to a cavity 26 within the body 12.

As illustrated, the choke valve assembly 10 includes a needle 28 and a seat assembly 30 (e.g., forming a choke trim). In the illustrated embodiment, the seat assembly 30 includes a housing 32 and a seat 34 (e.g., forming a positive bean). The housing 32 includes an internal passage, and the seat 34 is disposed within the internal passage of the housing 32. In addition, the seat 34 has a flow passage extending through the seat 34. With the choke valve assembly 10 in the illustrated closed state, the needle 28 is engaged with the seat 34, thereby blocking flow of the fluid from the cavity 26 to an outlet passage 36 that extends to the outlet 16. Movement of the needle 28 away from the seat assembly 30 along a longitudinal axis 38 of the choke valve assembly 10 forms an orifice between the needle 28 and the seat 34, thereby facilitating flow of the fluid from the cavity 26, through the flow passage of the seat 34, and into the outlet passage 36. The fluid then flows through the outlet passage 36 along an outlet flow direction 40 (e.g., along the longitudinal axis 38) to the outlet 16. Due to the shape of the needle 28, the cross-sectional area of the orifice increases as the needle 28 moves away from the seat 34. Accordingly, the flow rate of the fluid through the choke valve assembly 10 may be controlled by controlling the position of the needle 28 relative to the seat 34.

As illustrated, the needle 28 is coupled to a shaft 42 (e.g., by a threaded connection, a press-fit connection, a shrink-fit connection, a brazed connection, an adhesive connection, etc.), and the shaft 42 supports the needle 28 within the body 12 of the choke valve assembly 10. In addition, the shaft 42 is configured to drive the needle 28 to move along the longitudinal axis 38, thereby controlling the position of the needle 28 relative to the seat 34. In the illustrated embodiment, the handle 18 of the choke valve assembly 10 is coupled to the shaft and configured to drive the shaft 42 to move along the longitudinal axis 38. While the shaft 42 is driven to move by the handle 18 in the illustrated embodiment, in other embodiments, the shaft may be driven to move by another suitable actuator (e.g., alone or in addition to the handle), such as a hydraulic actuator, a pneumatic actuator, an electromechanical actuator, another suitable actuator, or a combination thereof.

Press-fitting includes coupling components to one another via engagement of a protrusion of one component with a recess of the other component (e.g., in which a cross-sectional area of the protrusion is greater than or equal to the cross-sectional area of the recess). Components may be coupled by press-fitting while the components are at an ambient temperature via application of an external force. Furthermore, shrink-fitting includes coupling components to one another via adjusting the temperature of at least one component, engaging a protrusion of one component with a recess of the other component, and enabling the at least one component to return to the ambient temperature. For example, the components may be coupled by shrink-fitting via heating the component with the recess to expand the recess, disposing the protrusion within the recess, and enabling the heated component to return to the ambient temperature. Additionally or alternatively, in certain embodiments, the components may be coupled by shrink-fitting via cooling the component with the protrusion to contract the protrusion, disposing the protrusion within the recess, and enabling the cooled component to return to the ambient temperature. In addition, brazing includes disposing a brazing material (e.g., wire, paste, solder, foil, etc.) between components, heating the brazing material (e.g., to at least partially melt the brazing material and to promote wetting between the brazing material and the components), and enabling the brazing material to cool to couple the components to one another. Furthermore, bonding includes disposing an adhesive (e.g., cement, high performance thermoplastic(s) (e.g., polyether (ether) ketone (P(E)EK), polysulfone, polyphenylene sulfide), epoxy resin, etc.) between components to couple the components to one another.

In the illustrated embodiment, the needle 28 includes a base portion 44 and a tip portion 46. As illustrated, the base portion 44 is coupled to the shaft 42 (e.g., by a threaded connection, a mechanical connection, a press-fit connection, a shrink-fit connection, a brazed connection, an adhesive connection, etc.), and the tip portion 46 is coupled to the base portion 44. The base portion 44 is formed from a non-superhard material (such as steel, steel alloys, or any other non-superhard material), the tip portion is formed from a superhard material, and a tip 48 of the needle 28 is formed by the tip portion 46.

As used herein, "superhard" refers to a material having a hardness of greater than or equal to 20 GPa based on Vickers hardness testing, and/or a material having a hardness of greater than or equal to 4500 Hardness Brinell (B) on the Brinell scale. Superhard materials may include diamond (e.g., PCD) or other superhard material(s), such as cubic boron nitride. Forming the tip portion 46 of the needle 28 from superhard material may substantially increase the longevity of the needle 28 (e.g., as compared to a needle in which the tip portion is formed from a non-superhard material). For example, a significant amount of abrasive material (e.g., sand, particles, etc.) may be entrained within the fluid flowing through the choke valve assembly 10 (e.g., while the choke valve assembly is in the open state). The abrasive material may flow through the orifice, which is formed by the tip portion 46 of the needle 28 and the seat 34, at a substantial speed. However, because the tip portion 46 of the needle 28 is formed from superhard material, wear/abrasion of the tip portion 46 may be substantially reduced (e.g., as compared to a needle having a tip portion formed from a non-superhard material), thereby increasing the longevity of the needle.

Furthermore, in certain embodiments, the seat 34 of the seat assembly 30 may be formed from superhard material (e.g., diamond, etc.). As previously discussed, the orifice is formed by the tip portion 46 of the needle 28 and the seat 34, and fluid containing a significant amount of abrasive material may flow through the orifice at a substantial speed. Because the seat 34 is formed from superhard material, wear/abrasion of the seat 34 may be substantially reduced (e.g., as compared to a seat formed from a non-superhard material), thereby increasing the longevity of the seat 34. Furthermore, in the illustrated embodiment, the needle has an angled seat-engaging surface, and the seat has an angled needle-engaging surface. In certain embodiments, the angle of the seat-engaging surface of the needle and the angle of the needle-engaging surface of the seat may be substantially equal, thereby establishing an effective seal while the choke valve assembly is in the closed state.

While the tip portion 46 of the needle 28 and the seat 34 of the seat assembly 30 are formed from superhard material in the illustrated embodiment, in other embodiments, the tip portion and/or the seat may be formed from a non-superhard material. Furthermore, the seat assembly housing 32 may be formed from a superhard material or a non-superhard material. In addition, while the seat assembly 30 includes a seat 34 and a housing 32 in the illustrated embodiment, in other embodiments, the housing may be omitted (e.g., the seat may couple to the body of the choke valve assembly). Furthermore, while the needle 28 includes the tip portion 46 and the base portion 44 in the illustrated embodiment, in other embodiments, the needle may include more or fewer portions (e.g., 1, 3, 4, or more). In addition, the tip portion 46 of the needle 28 may be removably coupled to the base portion 44 of the needle 28, the needle 28 may be removably coupled to the shaft 42, the seat 34 may be removably coupled to the seat assembly housing 32, the seat assembly housing 32 may be removably coupled to the body 12 of the choke valve assembly 10, or a combination thereof. Accordingly, the tip portion 46 of the needle 28, the needle 28, the seat 34, the seat assembly 30, or a combination thereof, may be removed and replace (e.g., due to wear of component(s), to establish different orifice configurations for different applications, etc.).

As used herein, a component "formed from" superhard material refers to a component in which at least relevant surface(s) of the component (e.g., fluid-engaging, bearing, etc. surfaces) are formed entirely by the superhard material. For example, the component may include a shell having outer layer(s) formed entirely of superhard material, in which the shell is coupled to a base/core of the component (e.g., by a brazed connection, an adhesive connection, a press-fit connection, a shrink-fit connection, a mechanical connection, a fastener connection, a threaded connection, other suitable connection(s), or a combination thereof) or formed on the base/core of the component (e.g., by a CVD process). Notably, a superhard material is not required to be based on each individual constituent. For instance, a polycrystalline diamond may include diamond particles, sintering aids, and catalyst materials. The sintering aids and catalyst materials themselves may not be considered superhard materials; however, when the components are sintered together, the resulting diamond lattice including the diamond, sintering aid, and catalyst material may exhibit superhard properties.

Accordingly, a component having a surface or outer layer formed entirely of superhard material may be formed as a single element (e.g., by a molding process, by a high-pressure high-temperature (HPHT) sintering process, by a machining/engraving/ablation process, by other suitable process(es), or a combination thereof). For example, diamond particles (e.g., diamond particle waste, etc.), powdered material (e.g., tungsten, silicon, etc.), and a metal (e.g., a cobalt alloy) may be formed into a desired shape within a press. The pressed elements may then be subjected to HPHT sintering to form a component having a core formed from the material (e.g., which may be chemically altered, such as forming tungsten carbide from the tungsten, forming silicon carbide from the silicon, etc.) and a diamond-containing shell (which can include sintering aids, catalyst materials, tungsten, carbide, etc.). The HPHT sintering process includes applying high pressure (e.g., greater than 5 GPa) and high temperature (e.g., greater than $1400°$ C.) to the elements to establish a polycrystalline diamond component. In certain embodiments, the pressed elements are reshaped within the HPHT sintering process, or the pre-HPHT forming step may be omitted, and the elements may be formed into the desired shape during the HPHT sintering process. Additionally or alternatively, a diamond-containing component (e.g., a polycrystalline diamond component, a natural diamond component formed entirely of diamond, a synthetic diamond component formed entirely of diamond, etc.) may be shaped via a laser ablation process, a machining process, an electrical discharge machining/grinding (EDM/EDG) process, or a combination thereof.

In a chemical vapor deposition (CVD) process, a diamond cover layer/shell may be grown onto the base/core. For example, layers of diamond are grown onto the base/core until a diamond cover layer/shell having a desired thickness is established. The layers closest to the core may include a mixture of the non-superhard material of the base/core and diamond. For example, a layer closest to the non-superhard material of the base/core may be substantially non-superhard material with a small amount of diamond. As additional layers are added/grown, the content of diamond relative to the base/core material increases until entirely diamond layers are formed (e.g., which establishes a diamond gradient). While growing layers of diamond onto a base/core using a CVD process is disclosed above, in certain embodiments, layers of diamond (e.g., including the diamond gradient) may be formed onto a base/core using the HPHT sintering process disclosed above. Furthermore, in certain embodiments, a shell may be formed separately from a base/core using the CVD process or the HPHT sintering process and coupled to the base/core.

According to some aspects, the tip portion 46 of the needle 28 is brazed to the base portion 44, or the tip portion 46 is connected to the base portion 44 with a brazed connection. As the needle 28 increases in size, including a diameter of the needle 28 and/or a length of the needle 28, the brazed connection may have a decreased effectiveness. This may be due, at least in part, to manufacturing tolerances between the tip portion 46 and the base portion 44, size changes due to differences in thermal expansion, the amount of braze material, the size of the gap between the brazed portions, any other reason, and combinations thereof. This may weaken the brazed connection, thereby increasing the likelihood that the brazed connection breaks and fails, resulting in failure of the choke valve assembly 10.

In accordance with at least one embodiment of the present disclosure, the needle 28 may be assembled by securing the tip portion 46 to the base portion 44 with a mechanical fastener. The tip portion 46 may include a bore in the body of the tip portion 46. An opening end of the bore may have an opening diameter that is larger than a terminal area of a terminal end of the bore. An expansion anchor may be inserted through the base portion 44 and into the bore. The head of the expansion anchor may be expanded so that the head engages the inner walls of the bore. This may create an interlocked connection with the expansion anchor. In this manner, the tip portion 46 may be removed from the base portion 44 by fracturing the tip portion 46, the base portion 44, the expansion anchor, and combinations thereof.

In some embodiments, the expansion anchor may be tightened so that the tip portion 46 is firmly secured to the base portion 44. This may place the base portion 44 in compression, and at least part of the tip portion 46 in tension. Superhard materials, such as polycrystalline diamond (PCD), may be relatively weak in tension. Surprisingly, it has been found that securing the PCD (or other superhard material) tip portion 46 to the base portion 44 with an expandable anchor placing a part of the PCD insert in tension may result in a more secure connection than a braze. In this manner, one or more embodiments of the present disclosure may increase the operational lifetime of the needle (or other PCD insert).

FIG. 2-1 is a cross-sectional view of a PCD assembly 250, according to at least one embodiment of the present disclosure. The PCD assembly 250 includes a PCD insert 252 secured to a mounting element 254 with an expansion anchor 256. The PCD insert 252 includes a body 258 having a retention end 259 and an operating end 260. The body 258 defines a bore 261. The bore 261 extends from the retention end 259 toward the operating end 260. In accordance with at least one embodiment of the present disclosure, the bore 261 is a blind bore. Put another way, the bore 261 extends partially through the body 258. In some embodiments, the bore 261 does not extend all the way through the body 258 to the operating end 260. The bore 261 has an opening 262 and a terminal end 263.

The bore 261 has an opening diameter 268 at the retention end 259. The opening diameter 268 may be the size of the opening of the bore 261. In some embodiments, the opening diameter 268 may be in a range having a lower value, an upper value, or lower and upper values including any of 0.125 in. (3.2 mm), 0.25 in. (6.4 mm), 0.375 in. (9.5 mm), 0.5 in. (12.7 mm), 0.625 in. (15.9 mm), 0.75 in. (19.1 mm), 0.875 in. (22.2 mm), 0.938 in. (23.8 mm), 1.0 in. (25.4 mm), 2.0 in. (50.8 mm) or any value therebetween. For example, the opening diameter 268 may be greater than 0.125 in. (3.2 mm). In another example, the opening diameter 268 may be less than 1.0 in. (25.4 mm). In yet other examples, the opening diameter 268 may be any value in a range between 0.125 in. (3.2 mm) and 2.0 in. (50.8 mm). In some embodiments, it may be critical that the opening diameter 268 is between 0.25 in. (6.35 mm) and 0.938 in. (23.8 mm) to provide an opening for entry of the expansion anchor 256. In some embodiments, it may be critical that the opening diameter 268 is 50% or less of the diameter of the insert diameter 272 to retain strength in the body of the insert diameter 272.

The bore 261 has a bore length 270, which may be the distance between the opening 262 and the terminal end 263. In some embodiments, the bore length 270 may be in a range having a lower value, an upper value, or lower and upper values including any of 0.125 in. (3.2 mm), 0.25 in. (6.4 mm), 0.375 in. (9.5 mm), 0.5 in. (12.7 mm), 0.625 in. (15.9 mm), 0.75 in. (19.1 mm), 0.875 in. (22.2 mm), or any value therebetween. For example, the bore length 270 may be greater than 0.125 in. (3.2 mm). In another example, the bore length 270 may be less than 0.875 in. (22.2 mm). In yet other examples, the bore length 270 may be any value in a range between 0.125 in. (3.2 mm) and 0.875 in. (22.2 mm). In some embodiments, it may be critical that the bore length 270 is between 0.25 in. (6.4 mm) and 0.75 in (19.1 mm) to retain the PCD insert 252 without weakening it.

The bore 261 has a terminal diameter 269 at the terminal end 263 of the bore 261. In some embodiments, the terminal diameter 269 may be in a range having a lower value, an upper value, or lower and upper values including any of 0.25 in. (6.4 mm), 0.375 in. (9.5 mm), 0.5 in. (12.7 mm), 0.625 in. (15.9 mm), 0.75 in. (19.1 mm), 0.875 in. (22.2 mm), 1.0 in. (25.4 mm), 1.125 in. (28.6 mm), or any value therebetween. For example, the terminal diameter 269 may be greater than 0.25 in. (6.4 mm). In another example, the terminal diameter 269 may be less than 1.125 in. (28.6 mm). In yet other examples, the terminal diameter 269 may be any value in a range between 0.25 in. (6.4 mm) and 1.125 in. (28.6 mm). In some embodiments, it may be critical that the terminal diameter 269 is greater than 0.875 in. (22.2 mm) to allow the expansion anchor 256 to expand within the bore 261.

The bore 261 has an inner wall that extends between the opening 262 and the terminal end 263. The inner wall may extend at a bore angle 271. In some embodiments, the bore angle 271 may be in a range having a lower value, an upper value, or lower and upper values including any of 2.0°, 2.5°, 3.0°, 4.0°, 5.0°, 7.5°, 10°, 12.5°, 15°, 20°, 25°, or any value therebetween. For example, the bore angle 271 may be greater than 2.0°. In another example, the bore angle 271 may be less than 25°. In yet other examples, the bore angle 271 may be any value in a range between 2° and 25°. In some embodiments, it may be critical that the bore angle 271 is between 5.0° and 15° to expand the diameter of the bore

261 sufficiently for the expansion anchor 256 to suitably grip the inner wall of the PCD insert 252.

The PCD insert 252 has an insert diameter 272. In some embodiments, the insert diameter 272 may be the largest diameter of the PCD insert 252. In some embodiments, the insert diameter 272 may be the diameter of the PCD insert 252 at the retention end 259. In some embodiments, the insert diameter 272 may be in a range having a lower value, an upper value, or lower and upper values including any of 0.75 in. (19.1 mm), 0.875 in. (22.2 mm), 1.0 in. (25.4 mm), 1.125 in. (28.6 mm), 1.25 in. (31.8 mm), 1.375 in. (34.9 mm), 1.5 in. (38.1 mm), or any value therebetween. For example, the insert diameter 272 may be greater than 0.75 in. (19.1 mm). In another example, the insert diameter 272 may be less than 1.5 in. (38.1 mm). In yet other examples, the insert diameter 272 may be any value in a range between 0.75 in. (19.1 mm) and 1.5 in. (38.1 mm). In some embodiments, it may be critical that the insert diameter 272 is at least 0.75 in. (19.1 mm) to provide a mechanism to secure the PCD insert 252 to the mounting element 254 that does not include braze material.

In accordance with at least one embodiment of the present disclosure, the bore 261 may be formed in the PCD insert 252 in any manner. For example, the bore 261 may be formed by casting, by machining, using multi-axis laser ablation, EDM sinking, grinding, any other manufacturing method, and combinations thereof.

The mounting element 254 includes a mount bore 264. The mount bore 264 may extend through the mounting element 254. To assemble the PCD assembly 250, the body 258 may be placed next to the mounting element 254 such that the bore 261 and the mount bore 264 are aligned. The expansion anchor 256 may be extended through the mounting element 254. For example, a shaft 265 may be inserted through the mount bore 264 and into the bore 261. An expansion head 266 of the expansion anchor 256 may be inserted into the bore 261. The expansion head 266 includes an expansion element 267.

In the view shown in FIG. 2-1, the expansion head 266, and the expansion element 267, is in a retracted configuration. In the retracted configuration, the head diameter of the expansion head 266 may be less than an opening diameter 268 of the opening 262, thereby allowing the expansion head 266 to fit through the opening 262 of the bore 261. This may allow the expansion head 266 and the expansion element 267 to be inserted into the bore 261.

In accordance with at least one embodiment of the present disclosure, the opening diameter 268 may be smaller than or less than the terminal diameter 269. This may allow the expansion anchor 256 to expand within the bore 261 until an expanded diameter of the expansion head 266 is greater than the opening diameter 268, as may be seen in FIG. 2-2 with the expansion head 266 in the expanded position. Expanding the expansion head 266 until its expanded diameter is larger than the opening diameter 268 may prevent removal of the expansion anchor 256 from the bore 261.

As may be seen in FIG. 2-2, when the expansion head 266 is expanded into the expanded state, the expansion element 267 may engage the inner wall of the bore 261. As may be seen, the expanded diameter of the expansion element 267 is larger than the opening diameter 268 of the bore 261. In this manner, if a removal force (e.g., a force to the right in the view shown) is applied to the PCD insert 252, the contact of the expansion element 267 with the inner wall of the bore 261, thereby preventing separation of PCD insert 252 from the mounting element 254.

In some embodiments, a radially outward force may be applied to the expansion element 267 to place the expansion head 266 in the expanded position. In some embodiments, the expansion force may be applied until the expansion element 267 contacts the inner wall of the bore 261. In some embodiments, the expansion force may be applied after the expansion element 267 engages the inner wall of the bore 261. This may increase the friction force of the expansion head 266 against the PCD insert 252.

In some embodiments, the expansion head 266 may create an interference connection with the body 258 of the PCD insert 252 at the bore 261. The interference connection may prevent the removal of the PCD insert 252 from the mounting element 254 without the body 258 deforming or fracturing, the mounting element 254 deforming or fracturing, and/or the expansion anchor 256 deforming or fracturing.

The expansion force may cause the expansion element 267 to deform. In some embodiments, the expansion element 267 may deform at least partially to the profile of the inner wall of the bore 261. In some embodiments, the expansion element 267 may deform to an entirety of the profile of the inner wall of the bore 261. In some embodiments, deforming to the profile of the bore 261 may help to improve the retention capacity of the expansion head 266. For example, deforming to the profile of the bore 261 may increase the contact area of the expansion head 266 against the profile of the inner surface of the bore 261.

In accordance with at least one embodiment of the present disclosure, the expansion force on the expansion head 266 may be applied in any manner. For example, a tightening head 273 of the expansion anchor 256 may be rotated, thereby rotating the shaft 265. The shaft 265 may be threaded, and rotation of the threaded shaft 265 may apply a force longitudinal force on an expansion mechanism. The expansion mechanism may convert the longitudinal force into a radial force, which may be applied to the expansion element 267. For example, the expansion mechanism may be the buckling of beam members. In some embodiments, tightening the tightening head 273 may place the shaft 265 in tension, compressing the mounting element 254 between the tightening head 273 and the PCD insert 252.

As may be understood, applying the expansion force to the expansion head 266 may apply an outward force against the body 258 of the PCD insert 252. This may place the body 258 in tension. As may be understood, PCD may be brittle in tension. But, despite placing the PCD insert 252 in tension, the expansion anchor 256 securing the PCD insert 252 to the mounting element 254 may generate a stronger connection than a brazed connection, especially for PCD insert 252 having an insert diameter 272 that is greater than or equal to 0.75 in. (19.1 mm).

In accordance with at least one embodiment of the present disclosure, the PCD assembly 250 may include a kit for a PCD assembly. The kit for the PCD assembly may include the PCD insert 252, the mounting element 254, and the expansion anchor 256. Different manufacturers or suppliers may provide the various elements of the kit. For example, a first supplier may supply the PCD insert 252, a second supplier may supply the mounting element 254, and a third supplier may supply the expansion anchor 256. In some embodiments, as discussed herein, the PCD assembly 250 may only include, or may consist or consist essentially of, the PCD insert 252, the mounting element 254, and the expansion anchor 256. As may be understood, the PCD insert 252 may be secured to the mounting element 254 only using the expansion anchor 256.

Figure 3:
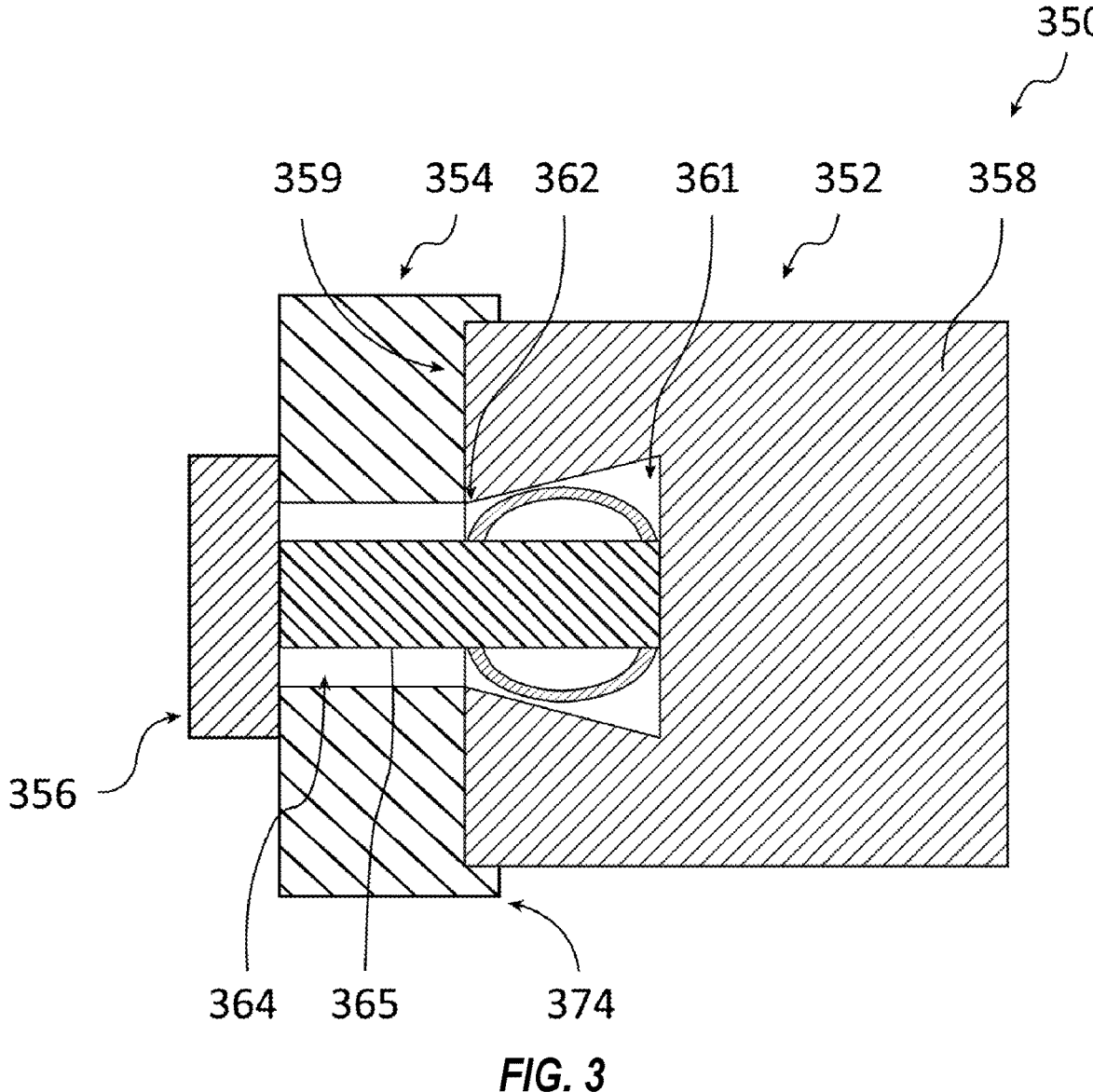
FIG. 3 is a cross-sectional view of a PCD assembly, according to at least one embodiment of the present disclosure.

FIG. 3 is a cross-sectional view of a PCD assembly 350 having a PCD insert 352 secured to a mounting element 354, according to at least one embodiment of the present disclosure. In the embodiment shown, the PCD insert 352 is secured to the mounting element 354 using both an expansion anchor 356 and a press-fit connection. The expansion anchor 356 may secure the PCD insert 352 to the mounting element 354 as discussed herein with respect to FIG. 2-1 and FIG. 2-2.

In accordance with at least one embodiment of the present disclosure, the mounting element 354 may include a press-fit cavity 374. A retention end 359 of the PCD insert 352 may be inserted into the press-fit cavity 374. In some embodiments, the retention end 359 may be inserted into the press-fit cavity 374 with a press-fit connection, as described herein. In some embodiments, the retention end 359 may be inserted into the press-fit cavity 374 with a shrink-fit connection. In some embodiments, the retention end 359 may be inserted into the press-fit cavity 374 with any other type of connection, including the connections discussed herein.

In some embodiments, the PCD insert 352 may be secured to the mounting element 354 with both a press-fit connection (or any other connection) and an expansion anchor 356. In some embodiments, the press-fit connection may provide additional strength to the connection between the PCD insert 352 and the mounting element 354. In some embodiments, the expansion anchor 356 may provide a retention force against longitudinal removal of the PCD insert 352 from the mounting element 354 (e.g., to the right and left in the view shown). In some embodiments, the press-fit connection may help to laterally secure the PCD insert 352 to the mounting element 354 (e.g., to the top and bottom in the view shown). In this manner, the combination of the press-fit connection and the expansion anchor 356 may increase the strength of the connection between the PCD insert 352 and the mounting element 354.

In some embodiments, the press-fit connection may help to align the PCD insert 352 with the mounting element 354. This may help to maintain the alignment and position of the PCD insert 352 during operation. In some embodiments, the press-fit connection may help to align an opening 362 of a bore 361 in the body 358 of the PCD insert 352 with a mount bore 364 in the mounting element 354. This may help to prevent lateral motion of the PCD insert 352 from apply a shear force to a shaft 365 the expansion anchor 356. A shear force on the shaft 365 may increase the likelihood that the shaft 365 is broken, and therefore preventing lateral motion of the PCD insert 352 may help to prevent damage to the shaft 365

In some embodiments, the PCD insert 352 may be press-fit to the mounting element 354 before the expansion anchor 356 is inserted through the mounting element 354 and into the bore 361. In some embodiments, tightening of the expansion anchor 356 may draw the PCD insert 352 into the press-fit cavity 374.

In some embodiments, the expansion anchor 356 may help to reduce a depth that the PCD insert 352 may be press-fit into the mounting element 354. For example, as discussed herein, press-fitting the PCD insert 352 to the mounting element 354 may help to align the PCD insert 352 to the mounting element 354. Because the expansion anchor 356 provides the retention force for the PCD insert 352, the press-fit connection may be reduced. In some embodiments, the press-fit connection may be less than an industry recommended depth.

Figure 4:
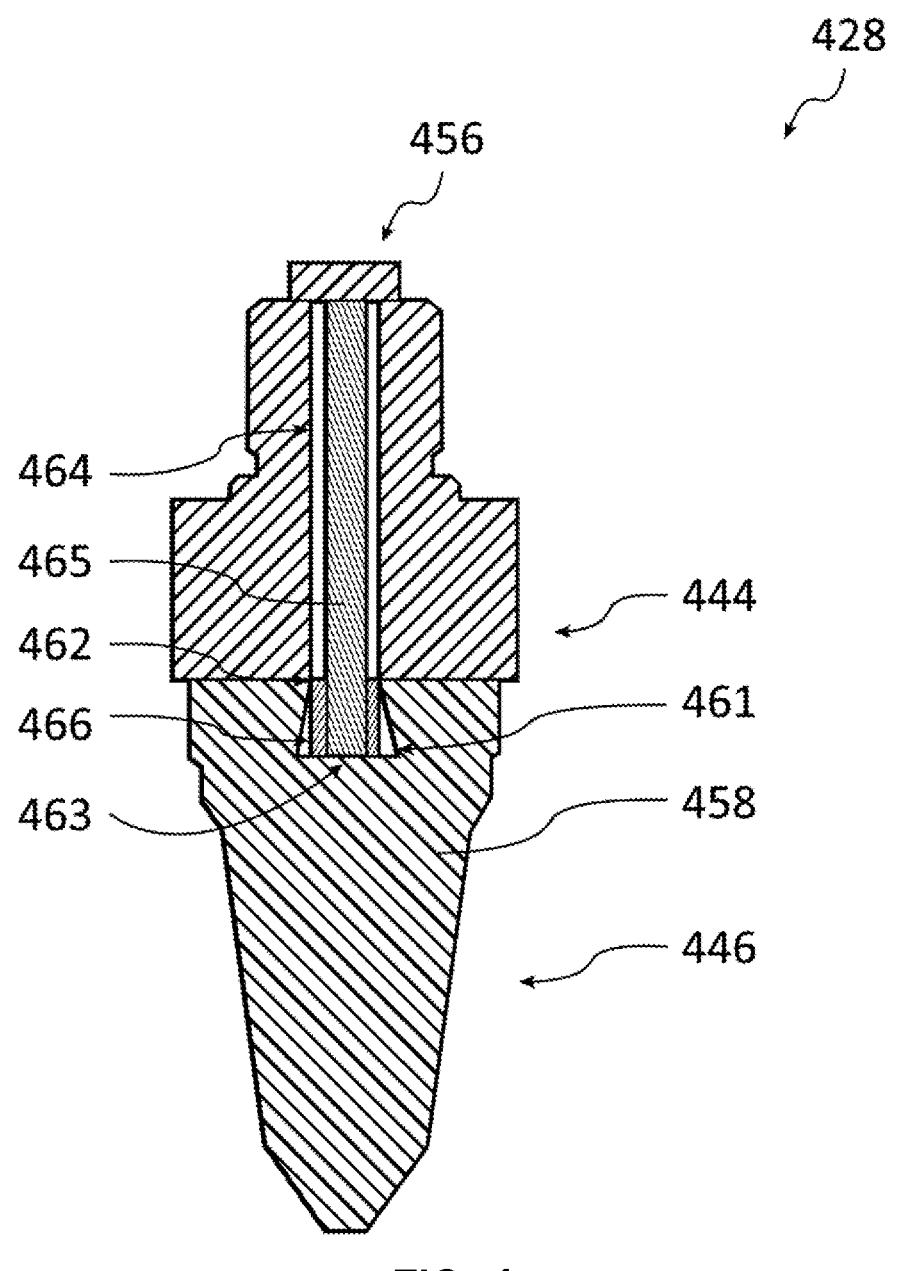
FIG. 4 is a cross-sectional view of a needle usable in a choke valve assembly, according to at least one embodiment of the present disclosure.

FIG. 4 is a cross-sectional view of a needle 428 having a base portion 444 secured to a tip portion 446, according to at least one embodiment of the present disclosure. In some embodiments, the needle 428 may be used in a choke valve, such as the choke valve assembly 10 of FIG. 1-1 and FIG. 1-2. For example, the tip portion 446 may be configured to engage with a seat, and a longitudinal position of the tip portion 446 with respect to the seat may adjust the flow through the choke valve. In some embodiments, the base portion 444 may be configured to be secured to a shaft, such as with a threaded connection or other connection.

In some embodiments, the tip portion 446 may be secured to the base portion 444 with an expansion anchor 456. The expansion anchor 456 may include a shaft 465. The shaft 465 of the expansion anchor 456 may be inserted through the base portion 444, such as through a mount bore 464. The mount bore 464 may extend through an entirety of the base portion 444. The mount bore 464 may be aligned with a bore 461 in a body 458 of the tip portion 446. As the shaft 465 is inserted through the base portion 444, an expansion head 466 of the expansion anchor 456 may be inserted into the bore 461 of the body 458 of the tip portion 446.

The bore 461 may have an opening 462 with an opening diameter that is less than a terminal diameter of a terminal end 463 of the bore 461. After the expansion head 466 is inserted into the bore 461, the expansion head 466 may be expanded until an expanded diameter of the expansion head 466 is greater than the opening diameter of the opening 462. In this manner, the tip portion 446 may be secured to the base portion 444.

Figures 1, 5:
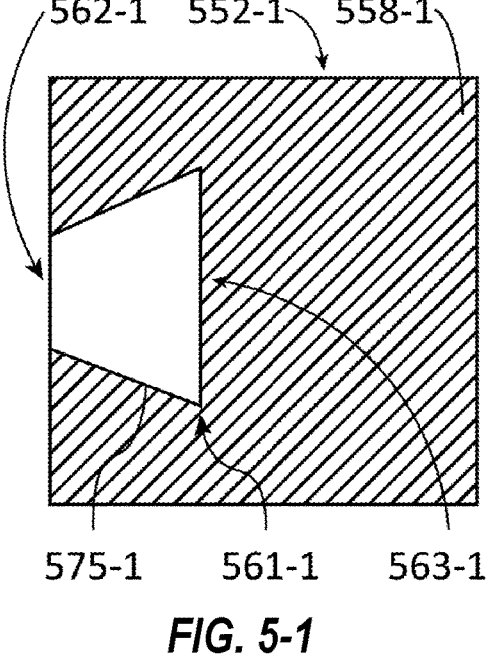
Figures 2, 5:
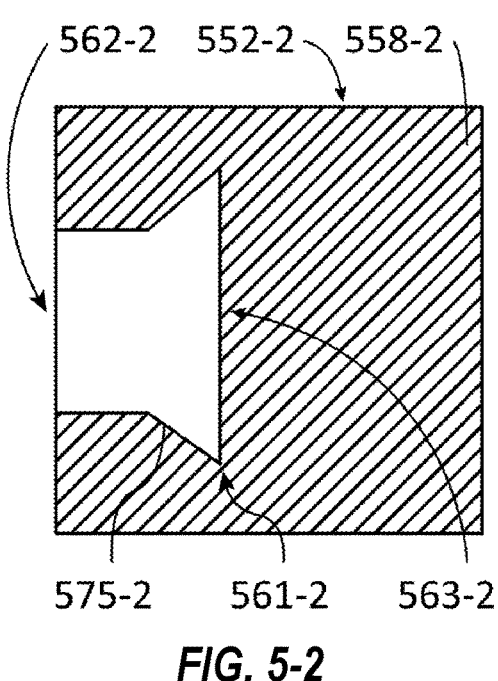
Figures 3, 5:
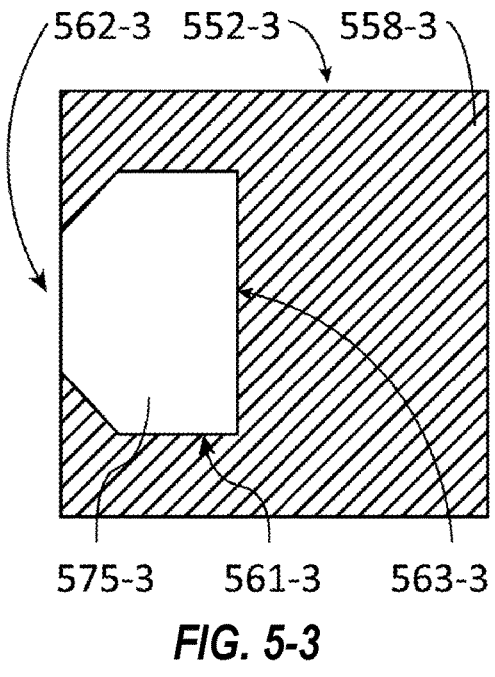
Figures 4, 5:
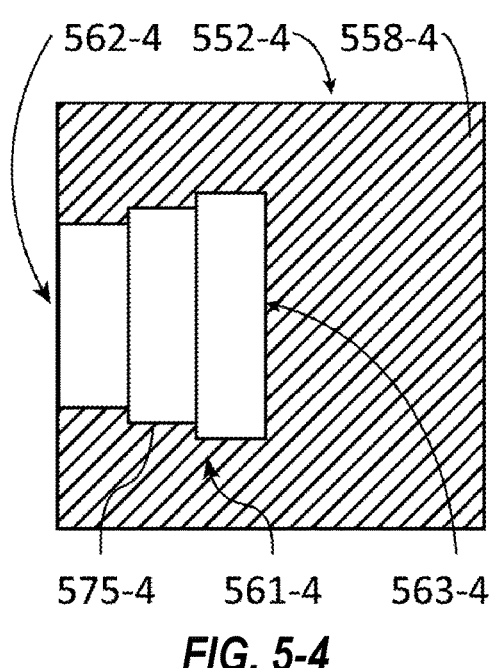
Figure 5:
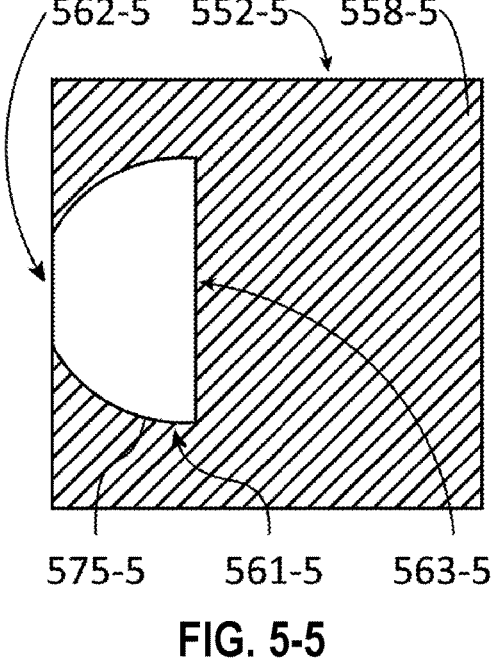
Figures 5, 6:
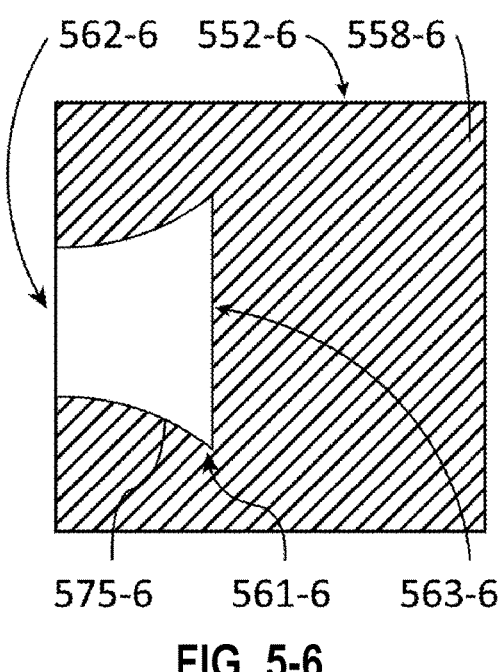
Figure 6:
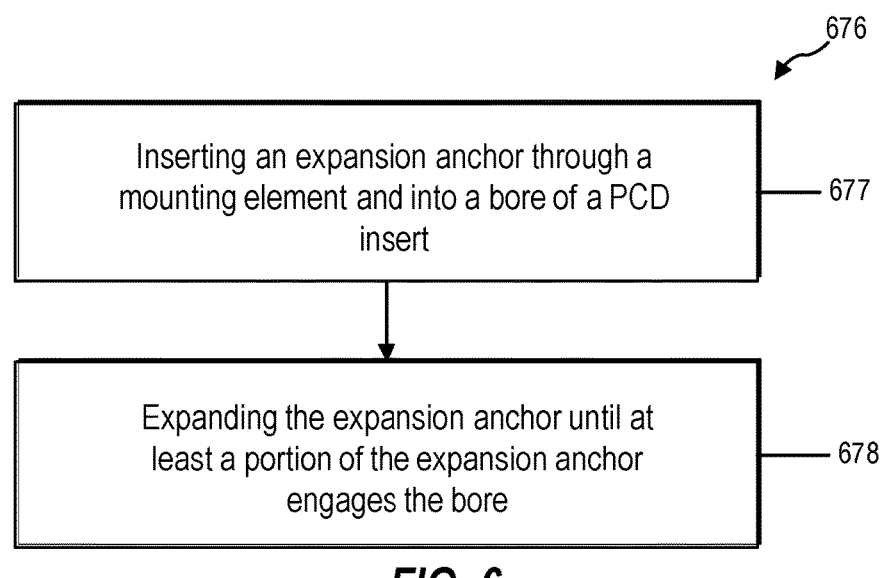

FIG. 5-1 through FIG. 5-6 are cross-sectional views of PCD inserts (collectively 552) having a bore (collectively 561) in a body (collectively 558) thereof, according to example embodiments of the present disclosure. As discussed herein, the bores 561 of the PCD inserts 552 may have an opening diameter that is smaller than a terminal diameter.

The bore 561 may have any shape or profile. For example, in FIG. 5-1, a first PCD insert 552-1 may have a first bore 561-1 in a first body 558-1. The first bore 561-1 has a first inner surface 575-1. In FIG. 5-1, the first inner surface 575-1 is straight from a first opening 562-1 to a first terminal end 563-1. In this manner, the first bore 561-1 may have a conical or frustoconical shape.

In FIG. 5-2, a second PCD insert 552-2 may have a second bore 561-2 in a second body 558-2. The second bore 561-2 has a second inner surface 575-2. In FIG. 5-2, the second inner surface 575-2 has an irregular shape. The irregular shape of the second inner surface 575-2 may include a straight section and an angled section. In the embodiment shown, the second inner surface 575-2 has a straight section closer to an opening 562-2. The second inner surface 575-2 has an angled section closer to a terminal end 563-2 of the second bore 561-2. The straight section may help to strengthen the second body 558-2 near the opening 562-2, while the angled section may receive an expansion anchor to secure the second PCD insert 552-2 to a mounting element.

In FIG. 5-3, a third PCD insert 552-3 may have a third bore 561-3 in a third body 558-3. The third bore 561-3 has a third inner surface 575-3. In FIG. 5-3, the third inner surface 575-3 has an irregular shape. The irregular shape of the third inner surface 575-3 may include a straight section and an angled section. In the embodiment shown, the third inner surface 575-3 has an angled section closer to an opening 562-3 of the third bore 561-3. The third inner surface 575-3 has a straight section closer to a terminal end 563-3 of the third bore 561-3. The angled section of the third inner surface 575-3 may help the expansion head of an expansion bolt to grab or hold the third PCD insert 552-3 to a mounting element.

In FIG. 5-4, a fourth PCD insert 552-4 may have a fourth bore 561-4 in a fourth body 558-4. The fourth bore 561-4 has a fourth inner surface 575-4. In FIG. 5-4, the fourth inner surface 575-4 has an irregular shape. The irregular shape of the fourth inner surface 575-4 may be stepped or tiered. For example, the fourth inner surface 575-4 shown includes a first step having a first diameter at the fourth opening 562-4. A second step has a second diameter, larger than the first step and the first diameter. A third step at the fourth terminal end 563-4 may have a third diameter, with the third diameter being larger than the first and second diameters. The stepped profile of the fourth bore 561-4 may provide multiple ledges or lips for the expansion head of the expansion anchor to grip, thereby improving the connection of the expansion anchor to the fourth PCD insert 552-4.

In FIG. 5-5, a fifth PCD insert 552-5 may have a fifth bore 561-5 in a fifth body 558-5. The fifth bore 561-5 has a fifth inner surface 575-5. In FIG. 5-5, the fifth inner surface 575-5 has a curved profile. The curved profile may be any type of curve, such as a parabolic curve, a hyperbolic curve, a circular curve, an elliptical curve, any other type of curve, and combinations thereof. In the embodiment shown in FIG. 5-5, the fifth inner surface 575-5 has a profile that is concave between a fifth opening 562-5 and a fifth terminal end 563-5. This may increase the strength of the connection of the expansion anchor to the fifth PCD insert 552-5.

In FIG. 5-6, a sixth PCD insert 552-6 may have a sixth bore 561-6 in a sixth body 558-6. The sixth bore 561-6 has a sixth inner surface 575-6. In FIG. 5-6, the sixth inner surface 575-6 has a curved profile. The curved profile may be any type of curve, such as a parabolic curve, a hyperbolic curve, a circular curve, an elliptical curve, any other type of curve, and combinations thereof. In the embodiment shown in FIG. 5-6, the sixth inner surface 575-6 has a profile that is convex between a sixth opening 562-6 and a sixth terminal end 563-6. This may increase the strength of the sixth body 558-6 between the expansion anchor and the mounting element.

FIG. 6 is a flowchart of a method 676 for securing a PCD insert to a mounting element, according to at least one embodiment of the present disclosure. To secure the PCD insert to the mounting element, an expansion anchor is inserted through the mounting element and into a bore of the PCD insert at 677. The expansion anchor may be expanded until at least a portion of the expansion anchor engages an inner wall of the bore at 678.

In some embodiments, the PCD insert may be press-fit to the mounting element. In some embodiments, expanding the expansion anchor places at least a portion of the PCD insert in tension. In some embodiments, expanding the expansion anchor includes conforming an expansion head of the expansion anchor to a profile of the inner wall of the bore. In some embodiments, expanding the expanding anchor secures the PCD insert to the mounting element without brazing the PCD insert to the mounting element, or without using any braze material.

Figures 1, 7:
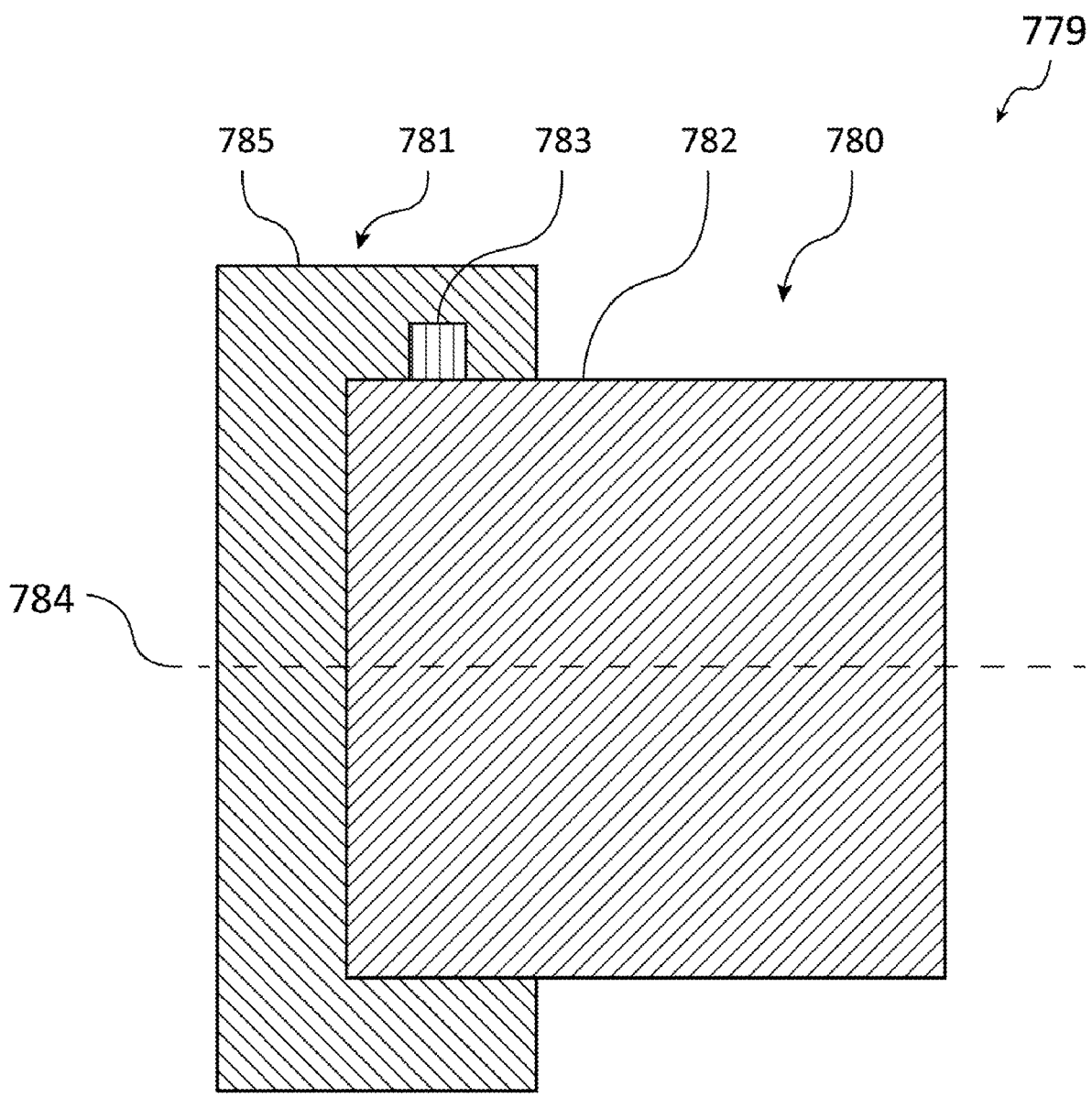
Figures 2, 7:
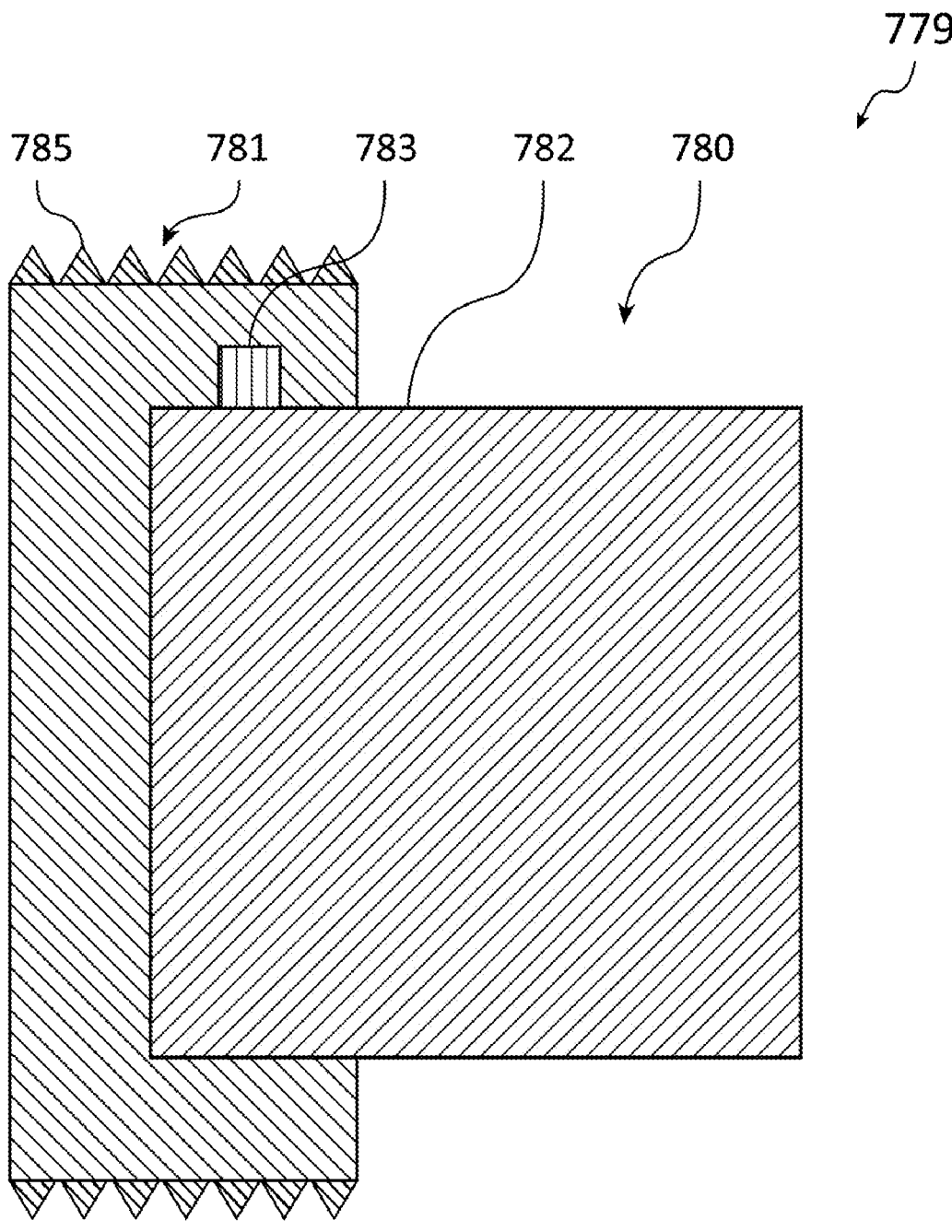

FIG. 7-1 is a cross-sectional view of a PCD assembly 779, according to at least one embodiment of the present disclosure. The PCD assembly 779 includes a PCD insert 780 and a mounting element 781. In some embodiments, the mounting element 781 may be cast to the PCD insert 780. Casting the mounting element 781 to or around the PCD insert 780 may allow the mounting element 781 to mold to the profile of an outer surface 782 of the PCD insert 780. In this manner, the PCD insert 780 may be secured to the mounting element 781 by casting the PCD insert 780 to the mounting element 781.

In some embodiments, the PCD insert 780 may include one or more retention features 783. The retention features 783 extend from the outer surface 782. In some embodiments, the retention features 783 may extend radially from the outer surface 782, or perpendicular to a longitudinal axis 784 of the PCD insert 780. The retention features 783 may include a protrusion, a knob, a tab, any other retention feature 783, and combinations thereof. In the embodiment shown, the PCD insert 780 has a single retention feature 783. However, it should be understood that the PCD insert 780 may include any number of retention features 783. For example, the PCD insert 780 may include 1, 2, 3, 4, 5, 6, 7, 8, 9, 10, or more retention features 783.

The retention features 783 may be spaced around a circumference of the outer surface 782. In some embodiments, the retention features 783 may be spaced evenly around the circumference of the outer surface 782. In some embodiments, the retention features 783 may be spaced unevenly with one or more different circumferential offsets or spacings around the circumference of the outer surface 782. In some embodiments, one or more, and potentially all, of the retention features 783 may be longitudinally aligned, and thus at the same axial position along the length of the PCD insert 780. In some embodiments, one or more of the retention features 783 may be located at different axial positions along the length of the PCD insert 780.

In some embodiments, the retention features 783 may be integrally formed in the PCD insert 780. For example, the retention features 783 may be formed with the PCD insert 780 when the PCD insert 780 is manufactured or cast. In some examples, the retention features 783 may be machined, ground, or otherwise added to the PCD insert 780 after formation. While the retention features 783 shown are shown extending away from the outer diameter of the outer surface 782, it should be understood that the retention features 783 may include holes, indentations, detents, or other sections that extend into the outer surface 782 of the PCD insert 780.

In some embodiments, the mounting element 781 may be cast around the circumference of the PCD insert 780. In this manner, the mounting element 781 may surround or envelop at least a portion of the PCD insert 780. In some embodiments, the mounting element 781 may be cast around the retention features 783. Casting the mounting element 781 around the retention features 783 may help to retain the mounting element 781 on the PCD insert 780. For example, the mounting element 781 may be cast on lateral or circumferential sides of the retention features 783. In this manner, an interference of the cast mounting element 781 with the retention features 783 may help to prevent rotation of the PCD insert 780 relative to the mounting element 781.

In some embodiments, the mounting element 781 may be cast on an upper and lower surface of the retention features 783. This may help to prevent longitudinal removal of the PCD insert 780 from the mounting element 781 (e.g., removal in a direction parallel to the longitudinal axis 784). In some embodiments, the mounting element 781 may be cast around an entirety of the retention features 783, thereby preventing both rotation and longitudinal removal of the PCD insert 780 with respect to the mounting element 781.

In some embodiments, the mounting element 781 may be cast around a portion of the circumference or outer perimeter of the PCD insert 780. In some embodiments, the mounting element 781 may be cast around an entire circumference or outer perimeter of the PCD insert 780. Casting the mounting element 781 around the entire circumference or outer perimeter of the PCD insert 780 may help to strengthen the connection of the PCD insert 780 to the mounting element 781.

In some embodiments, the mounting element 781 may be cast along a portion of the longitudinal length of the PCD insert 780. For example, the mounting element 781 may be cast at a retention end of the PCD insert 780, thereby allowing a working end of the PCD insert 780 to be exposed. The working end of the PCD insert 780 may be the end of the PCD insert 780 that engages a working surface. For example, the working end of the PCD insert 780 may include the tapered end of a needle for a choke valve. In some examples, the working end of the PCD insert 780 may include the contact surface of a cutting element. In some examples, the working end of the PCD insert 780 may be the working surface of any PCD insert 780 that is configured to come into contact with another element. The working end of the PCD insert 780 may be opposite the retention end 259. In some embodiments, the mounting element 781 may be cast along an entirety of a length of the PCD insert 780, thereby improving the strength of the connection of the PCD insert 780 to the mounting element 781.

In accordance with at least one embodiment of the present disclosure, the mounting element 781 may be cast directly onto the surface of the PCD insert 780. For example, the PCD insert 780 may be placed in a mold and the mounting element 781 may be cast onto the PCD insert 780 while the PCD insert 780 is in the mold. The mounting element 781 may be cast in any casting manner, such as powder metallurgy, sintering, laser cladding, melting and casting, any other metallurgical process, and combinations thereof. In some embodiments, the casting process may occur at an elevated temperature. The material of the mounting element 781 may have a different coefficient of thermal expansion than the PCD insert 780. As the mounting element 781 cools, the mounting element 781 may shrink or otherwise reduce in volume more than the PCD insert 780. This may cause the mounting element 781 to be secured to the PCD insert 780 with a shrink fit connection, in addition to being cast around the retention features 783. In some embodiments, the shrink fit connection may help to secure the mounting element 781 to the retention features 783.

In accordance with at least one embodiment of the present disclosure, the mounting element 781 may be made from a machinable material. For example, the mounting element 781 may be made from a metal or a metallic alloy, such as zinc, iron, steel, aluminum, any other metal or metallic alloy, and combinations thereof. In some embodiments, after the mounting element 781 is cast around the PCD insert 780, an outer surface 785 of the mounting element 781 may be processed or machined into a final shape or a final geometry.

In the embodiment shown in FIG. 7-2, the outer surface 785 has been machined or processed into outer threads of a threaded connection. By machining or processing the mounting element 781 with a connection mechanism, the mounting element 781 may be connected to another element, such as the shaft 42 of the choke valve assembly 10 shown in FIG. 1-2. In this manner, the PCD insert 780 may be secured to the shaft 42 using the connection mechanism machined into the outer surface 785 of the mounting element 781. While the connection mechanism shown in a threaded connection, it should be understood that any other connection mechanism may be utilized.

Figures 1, 8:
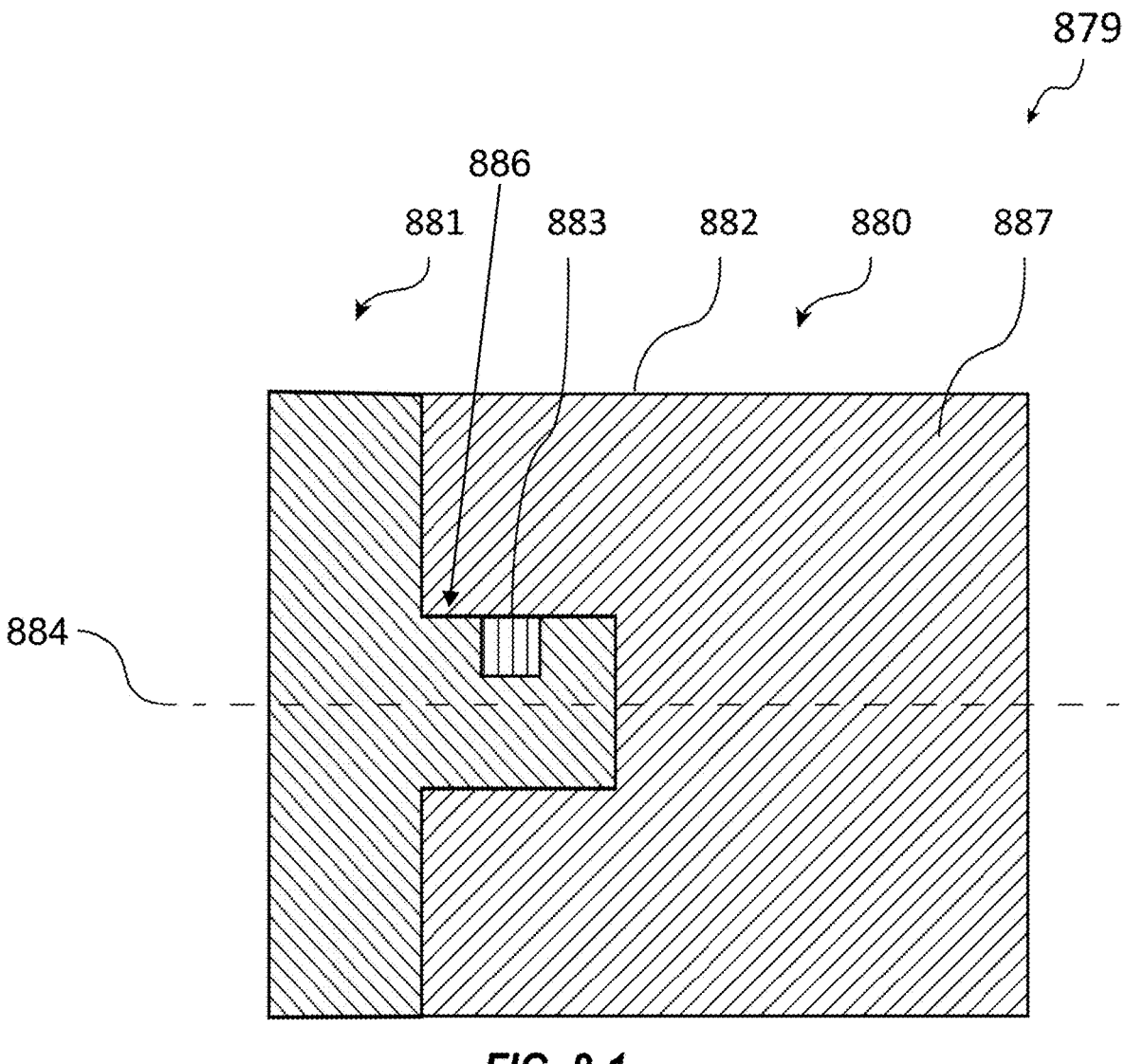
Figures 2, 8:
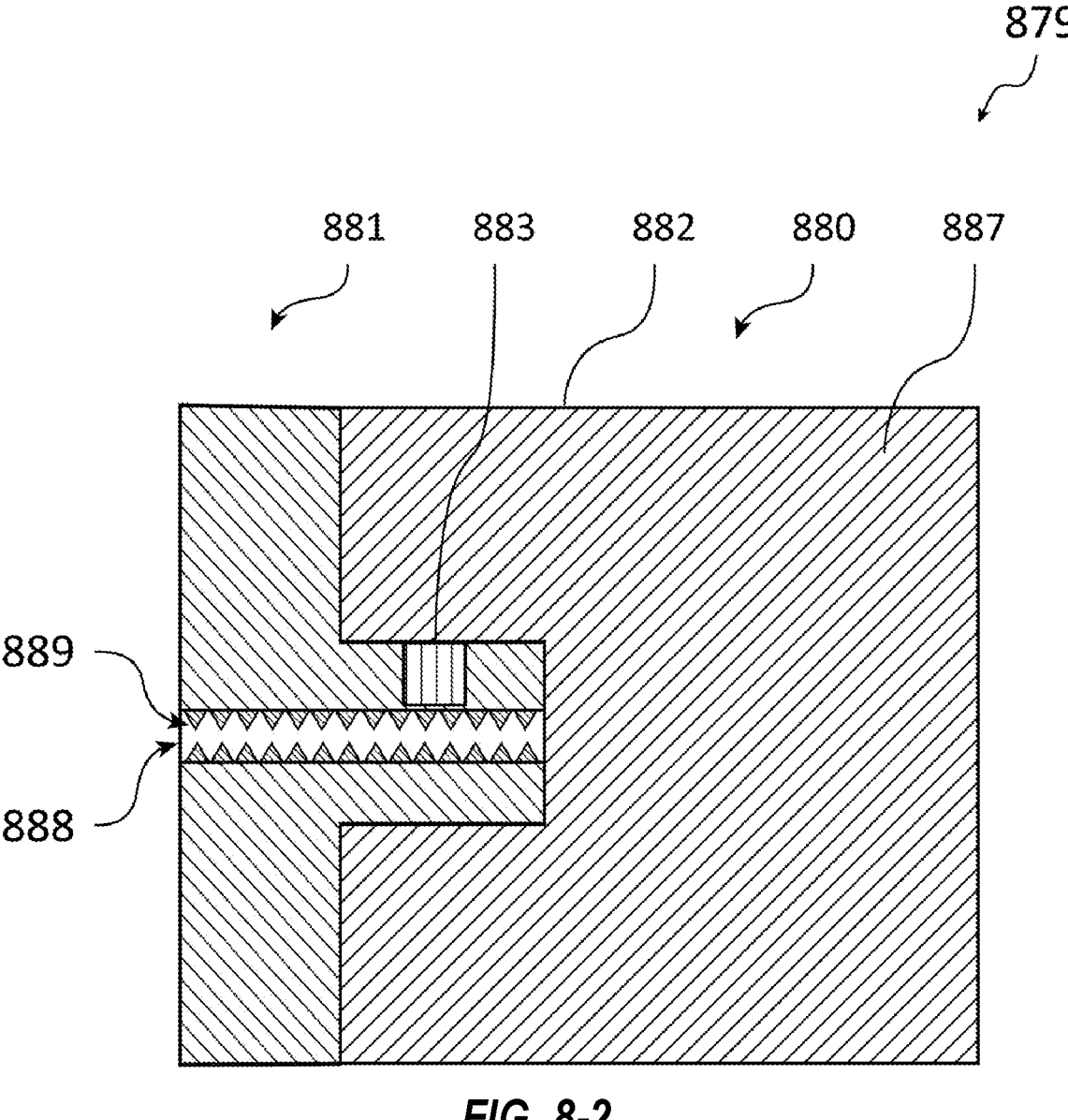

FIG. 8-1 is a cross-sectional view of a PCD assembly 879 having a mounting element 881 cast onto a PCD insert 880, according to at least one embodiment of the present disclosure. The PCD insert 880 includes a bore 886 extending into a body 887 of the PCD insert 880. The bore 886 may be a blind bore, or may not extend all the way through the body 887 of the PCD insert 880. In some embodiments, the bore 886 may be located in a center of the body 887. For example, the bore 886 may be centered along a longitudinal axis 884 of the PCD insert 880.

One or more retention features 883 may extend into the bore 886 from the body 887. The retention features 883 may protrude or extend inward from an inner surface of the bore 886. In some embodiments, the retention features 883 may include a protrusion, a knob, a tab, any other element extending from the inner surface of the bore 886, and combinations thereof. In some embodiments, the retention features 883 include a hollow, a bore, a hole, a detent, any other feature that extends into the body 887 from the bore 886, and combinations thereof.

In some embodiments, the mounting element 881 may be cast onto the PCD insert 880. The mounting element 881 may be cast into the bore 886. In some embodiments, the mounting element 881 may be directly cast onto the PCD insert 880. For example, the PCD insert 880 may be placed in a mold and the mounting element 881 may be cast onto the PCD insert 880 while the PCD insert 880 is in the mold. The mounting element 881 may be cast in any casting manner, such as powder metallurgy, sintering, laser cladding, melting and casting, any other metallurgical process, and combinations thereof.

In some embodiments, the mounting element 881 may be cast directly onto the retention features 883. In some embodiments, the mounting element 881 may be cast around the circumferential sides of the retention features 883. This may help to prevent the mounting element 881 from rotating within the bore 886. In some embodiments, the mounting element 881 may be cast around an upper and lower surface of the retention features 883. This may help to prevent the mounting element 881 from being laterally removed from the bore 886, such as in a direction parallel to the longitudinal axis 884. In some embodiments, the mounting element 881 may be cast onto circumferential and upper and lower surfaces of the retention features 883 to prevent both rotation and lateral removal of the mounting element 881 from the bore 886.

In accordance with at least one embodiment of the present disclosure, the mounting element 881 may be made from a machinable material. For example, the mounting element 881 may be made from a metal or a metallic alloy, such as zinc, iron, steel, aluminum, any other metal or metallic alloy, and combinations thereof. After the mounting element 881 is cast in the bore 886, the mounting element 881 may be machined into a final shape.

In FIG. 8-2, the mounting element 881 has been machined with a mounting element bore 888. The mounting element bore 888 may extend into the bore 886. The mounting element 881 may be machined with a connection mechanism 889. The connection mechanism 889 may include internal threads. The internal threads may be used to connect the PCD assembly 879 to another element. For example, the internal threads of the connection mechanism 889 may be used to connect the PCD assembly 879 to a shaft of a choke valve assembly, such as the shaft 42 of the choke valve assembly 10 of FIG. 1-2.

In accordance with at least one embodiment of the present disclosure, the mounting element 881 may be machined into any type of connection mechanism 889. Because the mounting element 881 is formed from a machinable material, the connection mechanism 889 may take any machinable form. In some embodiments, the mounting element 881 may be more easily machined than the body 887 of the PCD insert 880. This may allow the mounting element 881 to form various types of connection mechanisms 889.

In accordance with at least one embodiment of the present disclosure, the connection mechanism 889 may be used to connect the PCD assembly 879 to any element or structure. In this manner, the PCD assembly 879 may be any type of PCD assembly 879 that may be connected to another structure. For example, the PCD assembly 879 may include one or more of a needle for a choke valve, other pump parts, a cutting element, a pick head, any other PCD assembly 879, and combinations thereof.

In the embodiment shown in FIG. 8-1 and FIG. 8-2, the bore 886 has a cylindrical shape. However, it should be understood that the bore 886 may have any shape discussed herein. For example, the bore 886 may have any shape discussed and/or illustrated with respect to FIG. 5-1 through FIG. 5-6. In some embodiments, a bore 886 having an opening diameter that is less than a terminal diameter of the terminal end may help to reduce the removal of the mounting element 881 from the bore 886.

In accordance with at least one embodiment of the present disclosure, a PCD assembly may include a mounting element that is cast to both the bore and the outer surface 882 of the PCD insert. This may allow for a machined connection inside both the bore and an outer surface 882 of the PCD insert.

Figure 9:
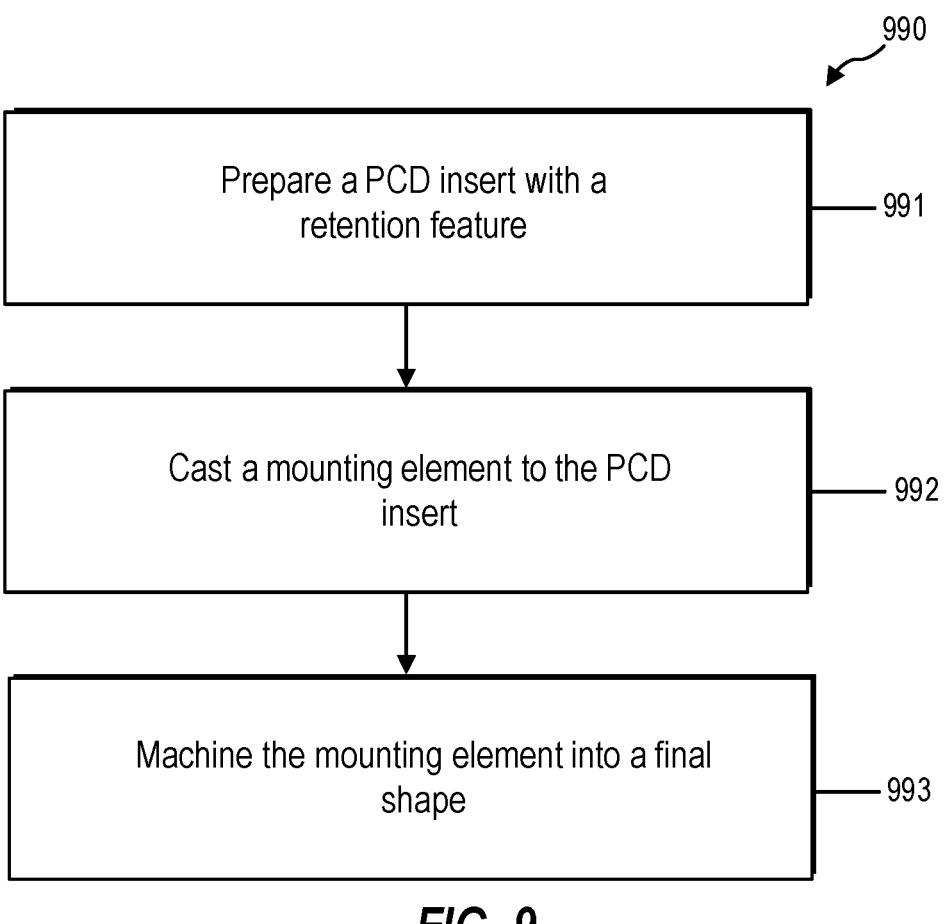
FIG. 9 is a flowchart of a method for forming a PCD assembly, according to at least one embodiment of the present disclosure.

FIG. 9 is a flowchart of a method 990 for forming a PCD assembly, according to at least one embodiment of the present disclosure. The method 990 may include preparing a PCD insert with a retention feature at 991. In some embodiments, the retention feature may be formed on an outer surface of the PCD insert. In some embodiments, the retention feature may be formed on an inner surface of a bore in the PCD insert. In some embodiments, a mounting element may be cast onto the PCD insert. The mounting element may be cast directly to the PCD insert at 992. In some embodiments, the mounting element may be cast around all surfaces of the retention feature. In some embodiments, casting the mounting element to the PCD insert may include cooling the mounting element on the PCD insert. This may cause a shrink-fit that at least partially connects the mounting element to the PCD insert. In some embodiments, casting the mounting element to the PCD insert may include casting the mounting element around an entirety of the PCD insert.

The mounting element may be machined into a final shape at 993. In some embodiments, the final shape may include external threads on an outer surface of the mounting element. In some embodiments, the final shape may include internal threads on an inner surface of a mounting bore. In some embodiments, the internal threads may extend into the bore of the PCD insert. In some embodiments, the machining the final shape may include machining the final shape, such as the threaded connection, across the retention features. In some embodiments, the PCD assembly formed by the PCD insert and the mounting element may be connected to a structure, such as the shaft of a choke valve assembly.

The following are example embodiments in accordance with the present disclosure:

A1. A polycrystalline diamond (PCD) assembly, comprising:
a PCD insert, the PCD insert having a body and an outer surface, the outer surface including a retention feature; and a mounting element molded to the PCD insert around at least a portion of the outer surface of body and the retention feature.

A2. The retention mechanism of A1, the mounting element being directly cast on the PCD insert.

A3. The retention mechanism of A1 or A2, the mounting element being formed from a machinable material.

A4. The retention mechanism of any of A1-A3, the mounting element being machined with a connection mechanism.

A5. The retention mechanism of A4, wherein the connection mechanism includes external threads of a threaded connection.

A6. The retention mechanism of any of A1-A5, wherein the retention feature includes a protrusion extending from the outer surface.

A7. The retention mechanism of any of A1-A6, wherein the mounting element is molded around an entirety of the retention feature.

B1. A polycrystalline diamond (PCD) assembly, comprising:
a PCD insert, the PCD insert having a body defining a bore, the bore including an anti-rotation feature; and
a mounting element molded to the PCD insert inside the bore and around the anti-rotation feature.

B2. The retention mechanism of B1, the mounting element being directly cast into the bore.

B3. The retention mechanism of B1 or B2, the mounting element being formed from a machinable material.

B4. The retention mechanism of any of B1-B3, the mounting element being machined with a connection mechanism.

B5. The retention mechanism of B4, wherein the connection mechanism includes internal threads of a threaded connection.

B6. The retention mechanism of any of B1-B5, wherein the anti-rotation feature includes a protrusion protruding into the bore.

B7. The retention mechanism of any of B1-B6, wherein the mounting element is molded around an entirety of the anti-rotation feature.

C1. A method, comprising:
preparing a polycrystalline diamond (PCD) insert with a retention feature on an outer surface of a body of the PCD insert;
casting a mounting element to the PCD insert, the mounting element being cast around the retention feature; and
machining the mounting element into a final shape.

C2. The method of C1, wherein machining the mounting element into a final shape includes machining a threaded connection onto the mounting element.

C3. The method of C1 or C2, wherein casting the mounting element to the PCD insert includes casting the mounting element around an entirety of the retention feature.

C4. The method of any of C1-C3, wherein casting the mounting element to the PCD insert includes cooling the mounting element on the PCD insert, the cooled mounting element applying a compressive force to the PCD insert.

C5. The method of any of C1-C4, wherein machining the mounting element into the final shape includes machining the final shape across the retention feature.

C6. The method of any of C1-C5, further comprising connecting the PCD insert and the mounting element to a shaft of a choke valve assembly.

The embodiments of the PCD assemblies have been primarily described with reference to choke valves; however, the PCD assemblies described herein may be used in applications used in drilling, production, or characterization of a wellbore, subterranean formation, or natural resource. In other embodiments, PCD assemblies of the present disclosure can be used in entirely different industries. Thus, PCD assemblies according to the present disclosure may be used outside a wellbore or other downhole environment used for the exploration or production of natural resources, including in a borehole used for other purposes, such as placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A polycrystalline diamond (PCD) valve insert, comprising:

a valve body including a retention end and a working end, the valve body having the PCD along a valve flow surface, the valve body defining a bore extending from the retention end into the valve body toward the working end, an opening of the bore having an opening diameter that is less than a terminal diameter of a terminal end of the bore, the bore continuously expanding from the opening diameter to the terminal diameter, and an inner wall of the bore being configured to contact an expansion anchor.

2. The PCD valve insert of claim 1, wherein the valve body has an insert diameter of at least 0.75 in. (19.1 mm).

3. The PCD valve insert of claim 1, wherein the bore has a bore length of between 0.25 in. (6.4 mm) and 0.75 in. (19.1 mm).

4. The PCD valve insert of claim 1, wherein the opening diameter of the bore is between 0.25 in. (6.4 mm) and 0.938 in. (23.8 mm).

5. The PCD valve insert of claim 1, wherein the inner wall of the bore has an angle of between 1° and 5° relative to a longitudinal axis of the valve body.

6. The PCD valve insert of claim 1, wherein the inner wall of the bore is frustoconical.

7. The PCD valve insert of claim 1, wherein the inner wall of the bore has a curved profile.

8. A kit for a polycrystalline diamond (PCD) valve assembly, comprising:

a PCD valve insert having a valve body, the valve body having the PCD along a valve flow surface, the valve body including a retention end and a working end, the valve body defining a bore extending from the retention end into the valve body toward the working end, an opening of the bore having an opening diameter that is less than a terminal diameter of a terminal end of the bore, the bore continuously expanding from the opening diameter to the terminal diameter;

a mounting element; and an expansion anchor having a tightening head and an expansion head, the expansion head being configured to be inserted through the mounting element and into the bore, the expansion head being expandable to contact an inner wall of the bore and secure the PCD valve insert to the mounting element.

9. The kit of claim 8, wherein the expansion anchor places at least a portion of the PCD valve insert in tension.

10. The kit of claim 8, wherein the inner wall of the bore has an angle of between 2° and 25° relative to a longitudinal axis of the valve body.

11. The kit of claim 8, wherein the expansion anchor secures the PCD valve insert to the mounting element without braze.

12. The kit of claim 8, wherein the expansion head of the expansion anchor conforms to a profile of the bore when the expansion anchor retains the PCD valve insert to the mounting element.

13. The kit of claim 8, wherein the PCD valve insert is configured to be press-fit to the mounting element via a press-fit interface separate from the bore, and the PCD valve insert is press-fit less below an industry recommended depth.

14. The kit of claim 13, wherein the expansion head comprises an expansion element disposed about a shaft that is expandable from a straight profile along the shaft to a curved profile protruding outwardly from the shaft, and the curved profile contacts and provides a retention force against the bore.

15. The kit of claim 8, wherein the PCD valve assembly consists essentially of the PCD valve insert, the mounting element, and the expansion anchor.

16. A method for securing a polycrystalline diamond (PCD) valve insert to a mounting element, comprising:

inserting an expansion anchor through the mounting element and into a bore in a valve body of the PCD valve insert, the valve body having the PCD along a valve flow surface configured to engage a valve seat, an opening of the bore having an opening diameter that is less than a terminal diameter of a terminal end of the bore, the bore continuously expanding from the opening diameter to the terminal diameter; and expanding the expansion anchor until at least a portion of the expansion anchor engages an inner wall of the bore.

17. The method of claim 16, further comprising press-fitting the PCD valve insert to the mounting element via a press-fit interface separate from the bore.

18. The method of claim 16, wherein expanding the expansion anchor places at least a portion of the PCD valve insert in tension.

19. The method of claim 16, wherein the inner wall of the bore has an angle of between 5° and 15° relative to a longitudinal axis of the valve body.

20. The method of claim 16, wherein expanding the expansion anchor comprises expanding an expansion element to a curved profile that contacts a frustoconical shape of the inner wall of the bore to secure the PCD valve insert to the mounting element without braze material, and the inner wall of the bore has an angle of between 2° and 25° relative to a longitudinal axis of the valve body.

* * * * *